United States Patent
Anania et al.

(10) Patent No.: US 10,475,135 B2
(45) Date of Patent: Nov. 12, 2019

(54) METHOD AND SYSTEM FOR PROVIDING SEARCHING AND CONTRIBUTING IN A SOCIAL MEDIA ECOSYSTEM

(71) Applicants: Tracy Anania, Paddock Lake, WI (US); Heather Sorensen, Paddock Lake, WI (US)

(72) Inventors: Tracy Anania, Paddock Lake, WI (US); Heather Sorensen, Paddock Lake, WI (US)

(73) Assignee: Lusiss Company, LLC, Salem, WI (US)

( * ) Notice: Subject to any disclaimer, the term of this patent is extended or adjusted under 35 U.S.C. 154(b) by 1353 days.

(21) Appl. No.: 14/587,341

(22) Filed: Dec. 31, 2014

(65) Prior Publication Data

US 2016/0189315 A1 Jun. 30, 2016

(51) Int. Cl.
*G06Q 10/00* (2012.01)
*G06Q 50/00* (2012.01)
*G06Q 30/06* (2012.01)
*G06Q 30/02* (2012.01)

(52) U.S. Cl.
CPC ......... *G06Q 50/01* (2013.01); *G06Q 30/0239* (2013.01); *G06Q 30/0633* (2013.01)

(58) Field of Classification Search
CPC .............. G06Q 50/01; G06Q 30/0633; G06Q 30/0239; G06Q 10/00
USPC .................................................. 705/319, 1.1
See application file for complete search history.

(56) References Cited

U.S. PATENT DOCUMENTS

| | | |
|---|---|---|
| 5,794,207 A | 8/1998 | Walker et al. |
| 6,928,416 B1 | 8/2005 | Bertash |
| 7,117,168 B2 | 10/2006 | Eaton |
| 7,313,539 B1 | 12/2007 | Pappas et al. |
| 7,783,537 B1 | 8/2010 | Van Luchene et al. |
| 7,865,424 B2 | 1/2011 | Pappas et al. |
| 7,962,375 B2 | 6/2011 | Pappas et al. |

(Continued)

OTHER PUBLICATIONS

Greer, Melvin et al. Personal Emergency Preparedness Plan (PEPP) . . . 2012 IEEE Ninth International Conference on Services Computing, May 18, 2012, accessed Sep. 1, 2019 <https://ieeexplore.ieee.org/abstract/document/6274182> (Year: 2012).*

*Primary Examiner* — Amanda C Abrahamson
*Assistant Examiner* — Shaun D Sensenig
(74) *Attorney, Agent, or Firm* — Lesavich High-Tech Law Group, S.C.; Stephen Lesavich

(57) ABSTRACT

A method and system for providing searching and contributing via social commerce within a social media ecosystem on a cloud communications network. A user is able to select as plural individual electronic lists, personal preferences and favorite items for social media ecosystem gifting, charitable contributing and time-of-need donating. Controlled access for the plural individual electronic lists selected by the user is provided to plural general search engine sites and plural social media sites in a social media ecosystem. Secure private permission-based viewing of and electronic operations on the stored plural individual electronic lists of favorite items is provided to plural other users so the plural other users can view and contribute a gift, charitable contribution or time-of-need donation. Electronic purchases of favorite items or electronic contributions to a charity or for time-of-need assistance are accepted.

20 Claims, 15 Drawing Sheets

(56) References Cited

U.S. PATENT DOCUMENTS

| | | |
|---|---|---|
| 7,996,292 B2 | 8/2011 | Pappas et al. |
| 8,032,447 B2 | 10/2011 | Pappas et al. |
| 8,224,714 B2 | 7/2012 | Yost |
| 8,229,841 B2 | 7/2012 | Pappas et al. |
| 8,301,550 B2 | 10/2012 | Pappas et al. |
| 8,463,765 B2 | 6/2013 | Lesavich |
| 8,533,015 B2 | 9/2013 | Meegan |
| 8,543,450 B2 | 9/2013 | Pappas et al. |
| 8,577,741 B1 | 11/2013 | Lyren et al. |
| 8,620,771 B2 | 12/2013 | Pappas et al. |
| 8,650,114 B2 | 2/2014 | Pappas et al. |
| 8,775,247 B2 | 7/2014 | Kendall et al. |
| 8,781,866 B2 | 7/2014 | Meegan et al. |
| 8,930,260 B2 | 1/2015 | Pappas et al. |
| 9,037,564 B2 | 5/2015 | Lesavich et al. |
| 9,137,250 B2 | 9/2015 | Lesavich et al. |
| 9,361,479 B2 | 6/2016 | Lesavich et al. |
| 9,569,771 B2 | 2/2017 | Lesavich et al. |
| 9,842,188 B2 * | 12/2017 | Stern ................. G06Q 10/10 |
| 2004/0128224 A1 | 7/2004 | Dabney et al. |
| 2005/0119947 A1 | 6/2005 | Lin |
| 2007/0112729 A1 | 5/2007 | Weisman et al. |
| 2008/0021810 A1 | 1/2008 | Pappas |
| 2008/0065514 A1 | 3/2008 | Eaton |
| 2008/0215457 A1 | 9/2008 | Pappas |
| 2008/0215495 A1 | 9/2008 | Pappas |
| 2009/0132387 A1 | 5/2009 | Majdoub |
| 2009/0234755 A1 | 9/2009 | Sidoruk |
| 2010/0145815 A1 | 6/2010 | Weng |
| 2010/0174709 A1 * | 7/2010 | Hansen ............. G06F 16/9537 |
| | | 707/728 |
| 2011/0029409 A1 | 2/2011 | Shusterman et al. |
| 2011/0131109 A1 | 6/2011 | Pappas et al. |
| 2011/0191318 A1 | 8/2011 | Gibey et al. |
| 2011/0208710 A1 | 10/2011 | Lesavich |
| 2011/0301986 A1 | 12/2011 | Pappas et al. |
| 2011/0307279 A1 | 12/2011 | Pappas et al. |
| 2012/0005285 A1 * | 1/2012 | Lin ..................... H04W 4/90 |
| | | 709/206 |
| 2012/0078698 A1 | 3/2012 | Pappas et al. |
| 2012/0226542 A1 * | 9/2012 | Blosser ................. G06Q 30/02 |
| | | 705/14.25 |
| 2012/0276868 A1 * | 11/2012 | Martell .............. H04L 12/1453 |
| | | 455/406 |
| 2012/0278622 A1 | 11/2012 | Lesavich et al. |
| 2012/0303484 A1 * | 11/2012 | Kim ..................... G06Q 50/01 |
| | | 705/26.61 |
| 2013/0013384 A1 | 1/2013 | Pappas et al. |
| 2013/0060591 A1 | 3/2013 | Meegan |
| 2013/0073430 A1 | 3/2013 | Gallen et al. |
| 2013/0096965 A1 | 4/2013 | Pappas et al. |
| 2013/0166360 A1 | 6/2013 | Kshetramade et al. |
| 2013/0191124 A1 | 7/2013 | Pappas et al. |
| 2013/0191244 A1 | 7/2013 | Pappas et al. |
| 2013/0191269 A1 | 7/2013 | Pappas et al. |
| 2013/0198009 A1 | 8/2013 | Pappas et al. |
| 2013/0198036 A1 | 8/2013 | Pappas et al. |
| 2013/0211970 A1 | 8/2013 | Glass et al. |
| 2013/0254003 A1 | 9/2013 | Pappas et al. |
| 2014/0006125 A1 | 1/2014 | Meegan |
| 2014/0006377 A1 | 1/2014 | Astore |
| 2014/0075385 A1 * | 3/2014 | Wan ................... G06O 10/1093 |
| | | 715/812 |
| 2014/0189792 A1 | 7/2014 | Lesavich et al. |
| 2014/0282016 A1 * | 9/2014 | Hosier, Jr. ............. H04W 4/08 |
| | | 715/733 |
| 2014/0368601 A1 * | 12/2014 | deCharms ............. H04W 4/021 |
| | | 348/14.02 |
| 2015/0066624 A1 | 3/2015 | Astore |
| 2015/0066673 A1 | 3/2015 | Astore |
| 2015/0066689 A1 | 3/2015 | Astore |
| 2015/0066892 A1 * | 3/2015 | Astore ................ G06F 17/30867 |
| | | 707/707 |
| 2015/0066992 A1 | 3/2015 | Tomarkin |
| 2015/0180833 A1 * | 6/2015 | Snow ................. G06F 21/6245 |
| | | 713/155 |
| 2015/0379301 A1 | 12/2015 | Lesavich et al. |
| 2016/0321654 A1 | 11/2016 | Lesavich et al. |

\* cited by examiner

SOCIAL COMMERCE

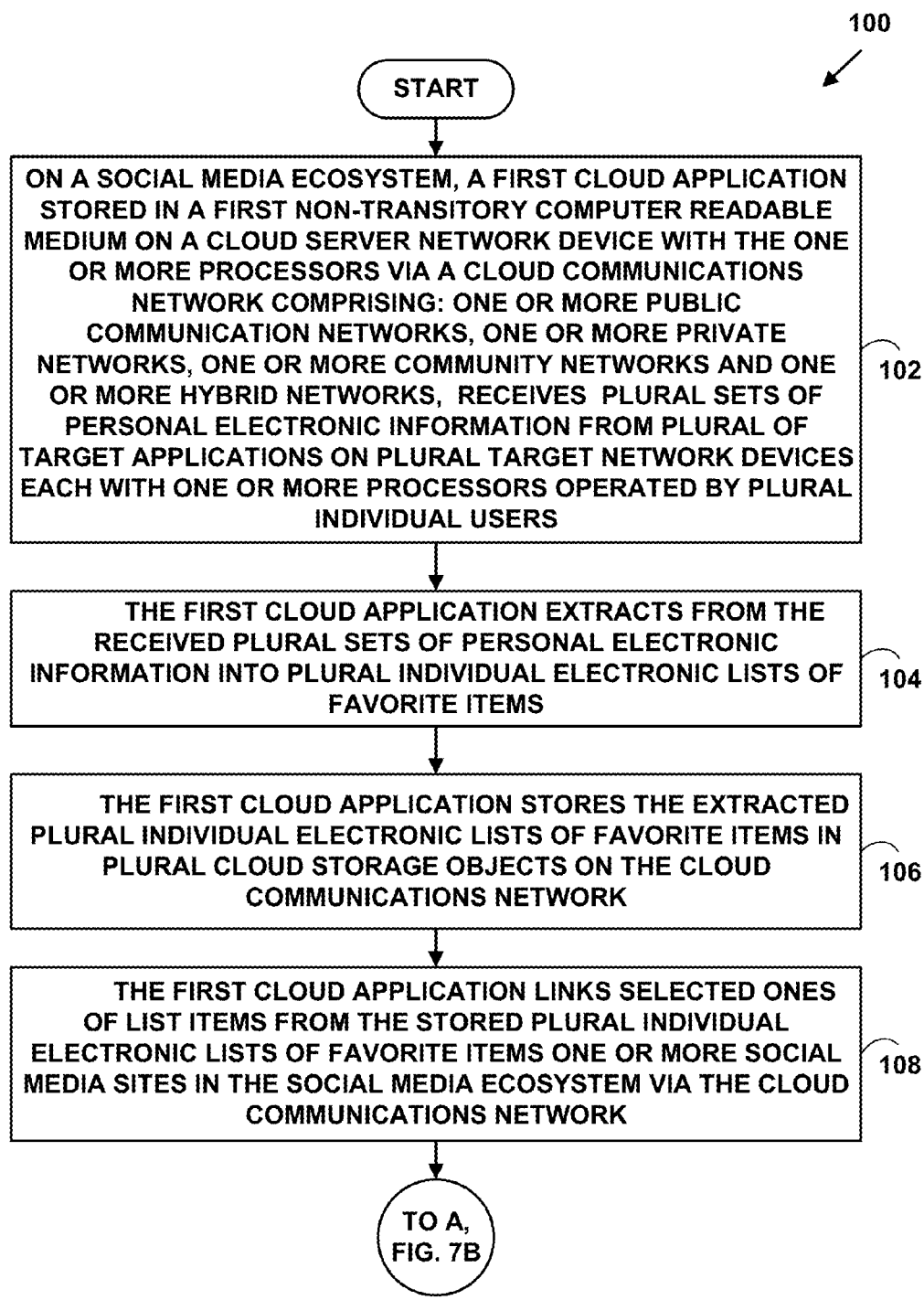

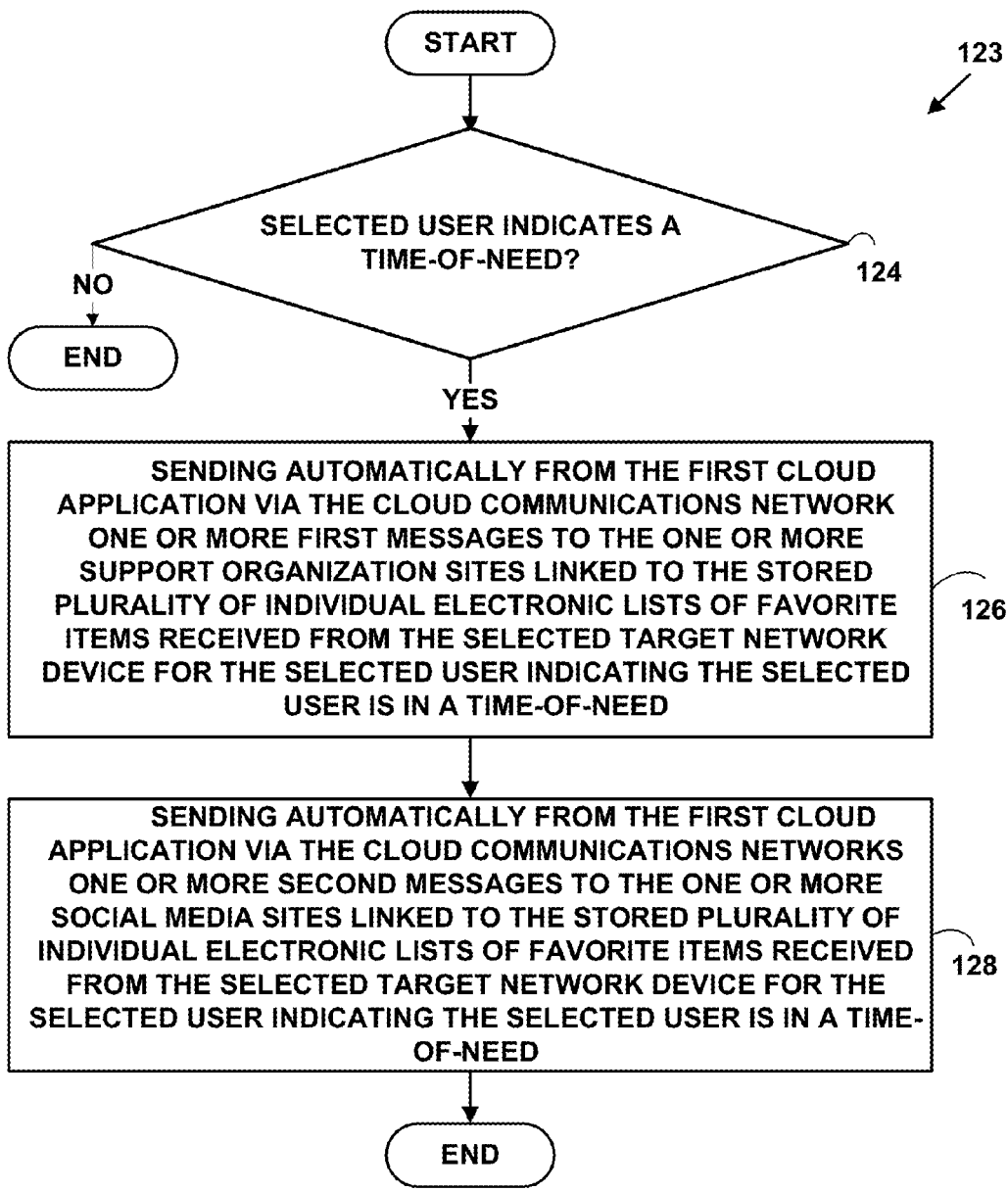

METHOD AND SYSTEM FOR PROVIDING SEARCHING AND CONTRIBUTING IN A SOCIAL MEDIA ECOSYSTEM

FIELD OF INVENTION

This invention relates to retrieving electronic information over a computer network. More specifically, it relates to a method and system for providing searching and contributing within a social media ecosystem.

BACKGROUND OF THE INVENTION

An "ecosystem" is a collection of entities and components linked together through communications and data flows. Ecosystems are controlled by both internal and external factors.

A "social media ecosystem" is a place to present the "wants" and "needs" of a person in social, career or leisure activities, for the benefit of that person and others, and for other individuals and businesses that feel that can satisfy any of the person's wants or needs.

"Social commerce" is a subset of electronic commerce that involves using social media, online media that supports social interaction, and user contributions to assist in creating social connection as well as the online buying and selling of products and services in a social media ecosystem.

In many instances it is desirable for a person to send a personalized gift to another person for a special occasion such as a birthday, anniversary, death, etc. However, it is often difficult to know or determine a person's personal preferences, such as size, color, type, etc.

It is also desirable for a person to send a charitable contribution on behalf of another person to a desired charity or cause. However, it is often difficult know or determine a person's personal preferences for desired charities or causes.

It is also desirable to help a person who is in a time-of-need to due to a life event such as a death, job loss, natural disaster. However, it is often difficult know or determine if a person is in a time-of-need and how the need can be met or satisfied.

There have been many attempts to solve some of these problems associated with assisting a person satisfy his/her wants or needs including many different types of gift registries.

For example, U.S. Pat. No. 8,577,841, that issued to Lyren teaches "One embodiment is a method that monitors, on the computer, activity of a member of a group to build a profile of the member. The profile of the member is used to generate recommendations for gifts that the member wants to receive to celebrate an event. The method then transmits the gifts to a website so other members of the group can select one of the gifts to purchase for the member."

U.S. Pat. No. 8,224,714, that issued to Yost teaches "Methods and computer storage media for communicating an electronic gift suggestion for a first user to a second user are provided. Accessing an online social network profile for a first user created by the first user in an online social network. Determining one or more gift suggestions for the first user and displaying the one or more gift suggestions in the online social network account of a second user. In some embodiment, the gift suggestions for the first user may be based on the social profile of the first user, based on the social profile of the first user utilizing an electronic gift wish list, or based on sales data of purchasers having similar personal information and purchasing history as personal information accessed from the first user's social profile."

U.S. Patent Published Patent Application No. 2013/0073430, published by Gallen et al. teaches "Systems, methods, and computer program products capable of facilitating gift giving are disclosed. The social media contacts of a consumer may be identified. Personal information may be stored for the social media contacts. The consumer may enter gift criteria for the social media contacts, and based on the criteria, it may be determined that a social media contact should receive a gift for a particular occasion. A gift may be automatically purchased and sent to the social media contact on behalf of the consumer."

U.S. Patent Published Patent Application No. 2009/0234755 published by Sidoruk teaches "he invention relates to a web based gift selection and ordering System comprising a web-based interface for Sender interaction and the entering of data; a database to store and allow access to that data; AI software to act upon that data to determine the appropriate gift; and a portal to e-commerce vendors on the internet to purchase the gift and have it shipped to the Recipient."

U.S. Published Patent Application No. 2005/0119947 published by Lin teaches "The present invention provides a gift recommending method and system. By the parameters input by the consumer, and using the powerful computer system and Internet connection, the worldwide members can register or the non-members can surf the present system. According to the preplanned database, the gifts can be recommended after the items that meet the input parameters of the consumer are found in the database, and the consumer can select the specific item from the recommended list. The database includes various product catalogs provided by the factory owners in each region for being selected by the consumer or recommending gifts after the consumer inputs the parameters. The system can inform the provider in the mailed region appointed by the consumer to send the selected gift to the receiver. By the interactions among the system of the present invention, the consumer and the factory owner, the consumer can buy the gift needed by the receiver in a more convenient and economic way."

However, none of these solutions solves all of the problems associated with assisting a person satisfy his/her wants or needs in a social media ecosystem. Thus, it is desirable to provide a method and system for searching and contributing via social commerce within a social media ecosystem.

SUMMARY OF THE INVENTION

In accordance with preferred embodiments of the present invention, some of the problems associated with searching and contributing in a social media ecosystem are overcome. A method and system for providing searching and contributing via social commerce within a social media ecosystem on a cloud communications network is presented.

A user is able to select plural individual electronic lists, personal preferences and favorite items for social media ecosystem gifting, charitable contributing and time-of-need donating. Controlled access for the plural individual electronic lists selected by the user is provided to plural general search engine sites and plural social media sites in a social media ecosystem. Secure private permission-based viewing of and electronic operations on the stored plural individual electronic lists of favorite items is provided to plural other users so the plural other users can view and contribute a gift, charitable contribution or time-of-need donation. Electronic purchases of favorite items or electronic contributions to a charity or time-of-need assistance accepted.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 7A, 7B and 7C are a flow diagram illustrating a method for social media ecosystem search and contributing;

FIG. 8 is a flow diagram illustrating a method for social media ecosystem search and contributing;

DETAILED DESCRIPTION OF THE INVENTION

Exemplary Cloud Social Media Ecosystem

Figure 1A:
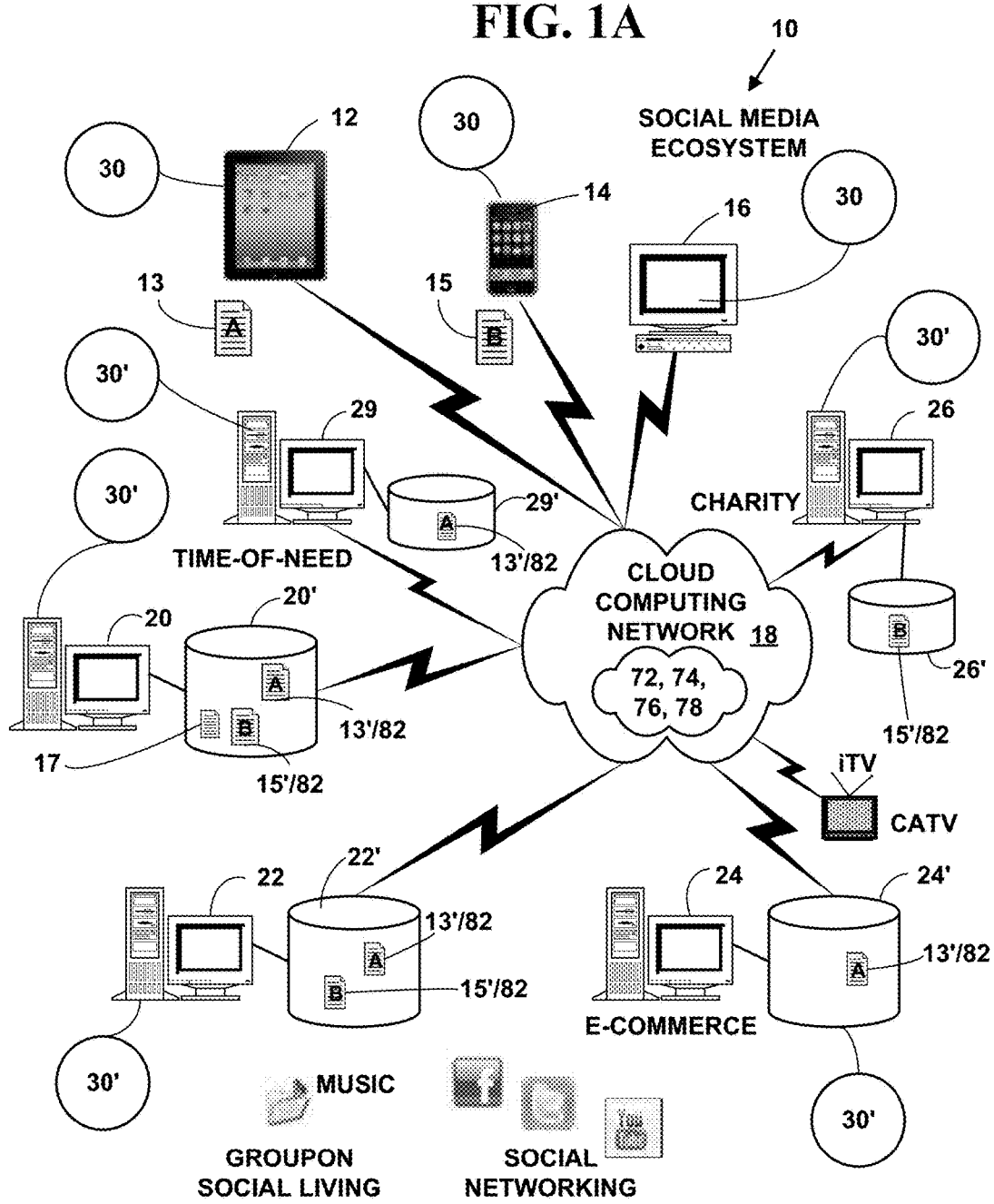
FIG. 1A is a block diagram illustrating an exemplary social media ecosystem system.

FIG. 1A is a block diagram illustrating an exemplary social media ecosystem 10. The exemplary electronic system 10 includes, but is not limited to, one or more target network devices 12, 14, 16 (only three of which are illustrated) each with one or more processors and each with a non-transitory computer readable medium.

Figure 1B:
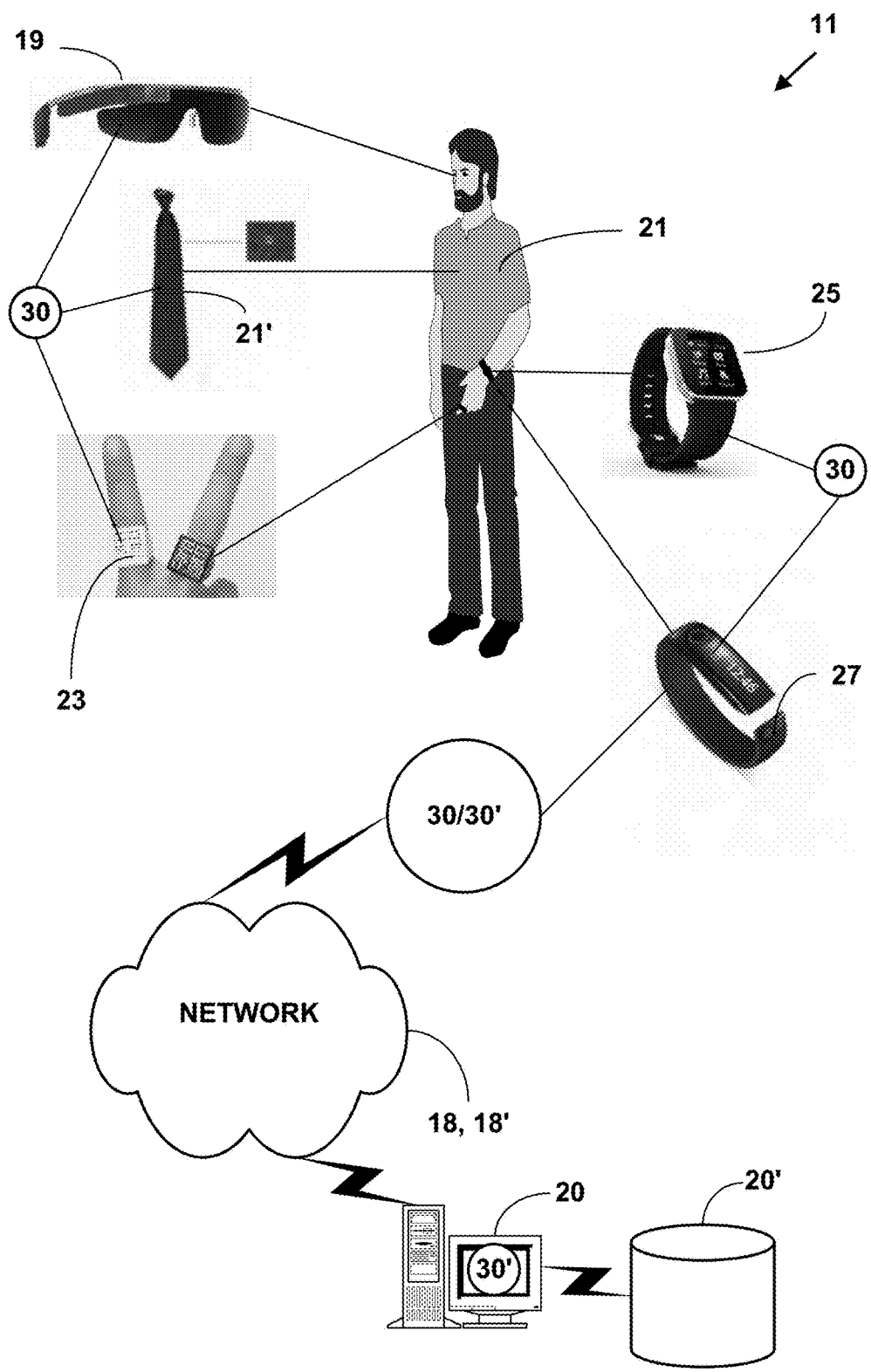
FIG. 1B is a block diagram illustrating exemplary wearable network devices.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), wearable network devices (e.g., glasses, watches, clothing, fitness trackers, etc. 19-27, See FIG. 1B, etc.) two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions and other types of network devices.

The one or more smart network devices 12, 14, 16, 19-27 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more smart network devices 12, 14, 16 include tablet computers such as the iPad, by Apple, Inc., the HP Tablet, by Hewlett Packard, Inc., the Playbook, by RIM, Inc., the Tablet, by Sony, Inc.

The target network devices 12, 14, 16, 19-27 are in communications with a cloud communications network 18 via one or more wired and/or wireless communications interfaces. The cloud communications network 18, is also called a "cloud computing network" herein and the terms may be used interchangeably. The invention may also be practiced on a non-cloud communications network 18 (e.g., the Internet, etc.).

The plural target network devices 12, 14, 16, 19-27 request desired electronic content 13, 15, etc. stored on the cloud communications network 18.

The cloud communications network 18 includes, but is not limited to, communications over a wire connected to the target network devices, wireless communications, and other types of communications using one or more communications and/or networking protocols.

Plural server network devices 20, 22, 24, 26, 29 (only five of which are illustrated) each with one or more processors and a non-transitory computer readable medium include one or more associated databases 20', 22', 24', 26', 29'. The plural network devices 20, 22, 24, 26, 29, are in communications with the one or more target devices 12, 14, 16, 19-27 via the cloud communications network 18.

Plural server network devices 20, 22, 24, 26, 29 (only five of which are illustrated) are physically located on one more public networks 76 (See FIG. 4), private networks 72, community networks 74 and/or hybrid networks 78 comprising the cloud network 18.

One or more server network devices (e.g., 20, etc.) securely stores a cloud content location map 17 and other plural server network devices (e.g., 22, 24, 26, 29 etc.) store portions 13', 15' of desired electronic content 13, 15 as cloud storage objects 82 (FIG. 5) as is described herein as 13'/82, 15'/82.

The plural server network devices 20, 22, 24, 26, 29, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26, 29 also include, but are not limited to, network servers used for cloud computing providers, etc.

The cloud communications network 18 includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

Wearable mobile technology" and/or "wearable devices" are clothing and accessories incorporating computer and advanced electronic technologies. Wearable mobile network devices provide several advantages including, but not limited to: (1) Quicker access to notifications. Important and/or summary notifications are sent to alert a user to view a whole new message. (2) Heads-up information, Digital eye wear allows users to display relevant information like directions without having to constantly glance down; (3) Always-on Searches. Wearable devices provide always-on, hands-free searches; and (4) Recorded data and feedback. Wearable devices also take telemetric data recordings and providing useful feedback for users for exercise, health, fitness, etc. activities.

Digital eyewear, such as GOOGLE Glass, Smart watches by SONY, NIKE, GARMIN, SAMSUNG, wrist bands and/or fitness bands by LG, NIKE, FITBIT, etc. and others are examples of wearable mobile devices. Just like mobile and non-mobiles phones, a current physical location of such wearable mobile devices must be determine in an emergency situation.

FIG. 1B is a block diagram with 11 illustrating exemplary wearable devices. The wearable network devices include one or more processors and include, but are not limited to, wearable digital glasses 19 (e.g., GOOGLE Glass, etc.), clothing 21 (e.g., smart ties/scarves 21', smart headwear, etc.), jewelry 23 (e.g., smart rings, smart earrings, etc.), watches 25 (e.g., SONY, NIKE, SAMSUNG, NIKE, GARMIN, etc.) and/or wrist bands or fitness bands 27 (e.g. GARMIN, FITBIT, POLAR, NIKE, JAWBONE, LG, etc.). The wearable mobile devices 19-27 includes cloud application 30 and/or 30' and/or non-cloud applications 30, 30'. All of the wearable devices 19-27 have one or more processors and/or selected ones have other components including, but not limited to, accelerometers, altimeters, music control, phone compatibility, etc. However, the present invention is not limited to such embodiments and more, fewer and other types of wearable devices can also be used to practice the invention.

An operating environment for the network devices of the exemplary social media ecosystem 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Social Media Ecosystem Display System

Figure 2:
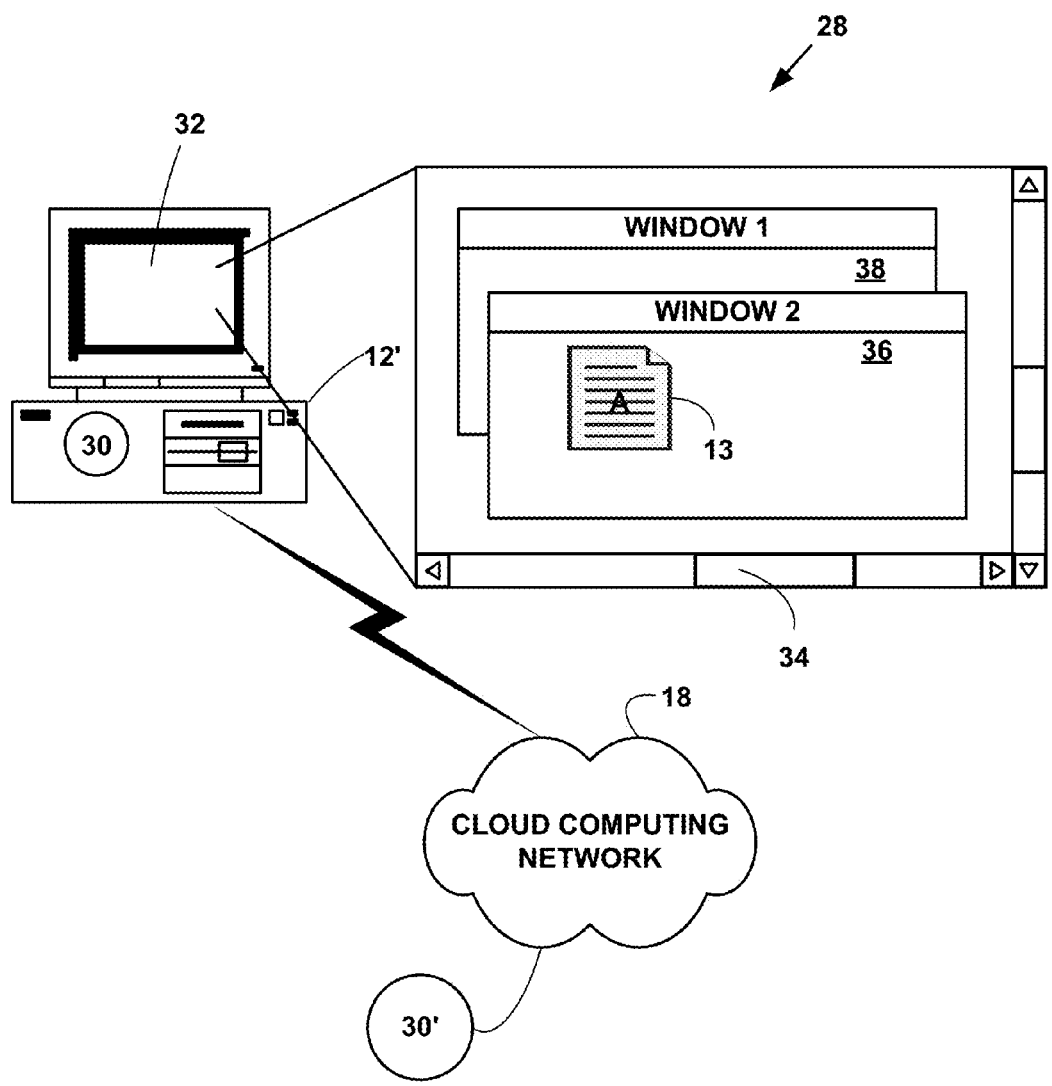
FIG. 2 is a block diagram illustrating an exemplary social media display system.

FIG. 2 is a block diagram illustrating an exemplary social media ecosystem 10 display system 28. The exemplary social media ecosystem display system includes, but is not limited to a target network device (e.g., 12, etc.) with a cloud application and/or non-cloud application 30 and a display component 32. The cloud application 30 presents a graphical user interface (GUI) 34 on the display 32 component. The GUI 32 presents a multi-window 36, 38, etc. (only two of which are illustrated) interface to a user.

In one embodiment of the invention, the cloud application 30 is a software application. However, the present invention is not limited to this embodiment and the cloud application 30 can be hardware, firmware, hardware and/or any combination thereof. However, the present invention is not limited these embodiments and other embodiments can be used to practice the invention In another embodiment, a portion of the cloud application 30 is executing on the target network devices 12, 14, 16, 19-27 and another portion of the cloud application and/or non-cloud application 30' is executing on the server network devices 20, 22, 24, 26, 29. However, the present invention is not limited these embodiments and other embodiments can be used to practice the invention.

Exemplary Networking Protocol Stack

Figure 3:
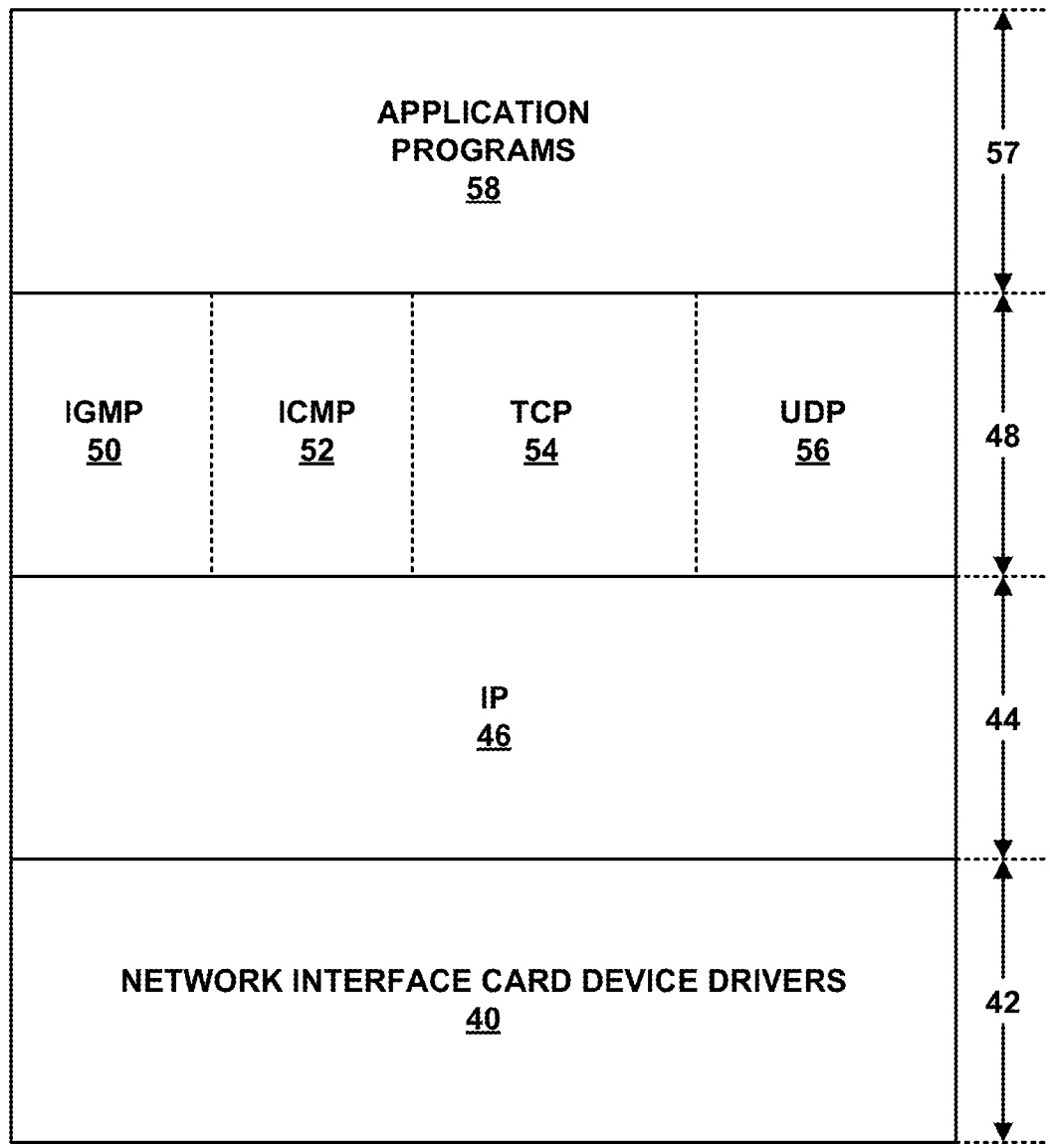
FIG. 3 is a block diagram illustrating an exemplary networking protocol stack.

FIG. 3 a block diagram illustrating a layered protocol stack 38 for network devices in the social media ecosystem 10. The layered protocol stack 38 is described with respect to Internet Protocol (IP) suites comprising in general from lowest-to-highest, a link 42, network 44, transport 48 and application 56 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 19-27, 20, 22, 24, 26, 29 are connected to the communication network 18 with Network Interface Card (NIC) cards including device drivers 40 in a link layer 42 for the actual hardware connecting the network devices 12, 14, 16, 19-27, 20, 22, 24, 26, 29 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 54 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30', etc.) to carry out desired functionality for a network device reside. For example, the application programs 54 for the client network devices 12, 14, 16, 19-27 may include a web-browsers or other application programs, cloud application program 30, while application programs for the server network devices 20, 22, 24, 26, 29 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

Wireless Interfaces

In one embodiment of the present invention, the wireless interfaces on network devices 12, 14, 16, 19-27, 20, 22, 24, 26, 29 include but are not limited to, 3G and/or 4G IEEE 802.11a, 802.11b, 802.11g, 802.11n, 802.15.4 (ZigBee™), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth™ and/or infra data association (IrDA) module for wireless Bluetooth™ or wireless infrared communications. However, the present invention is not limited to such an embodiment and other 802.1 lxx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

802.15.4 (Zigbee™) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the plural server network devices 20, 22, 24, 26, 29 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26, 29 and the cloud communications network 18. However, the present invention is not limited to the NICs described and other types of NICs in other configurations and connections with and/or without a buses can also be used to practice the invention.

In one embodiment, network devices 12, 14, 16, 19-27, 20, 22, 24, 26, 29 and wired and wireless interfaces including the NICs include "4G" components. "4G" refers to the fourth generation of wireless communications standards and speeds of 100 megabits/second to gigabits/second or more. 4G includes peak speed requirements for 4G service at least 100 Mbit/s for high mobility communication (e.g., trains, vehicles, etc.) and 1 Gbit/s for low mobility communication (e.g., pedestrians and stationary users, etc.).

4G technologies are a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs WiMAX Long Term Evolution (LTE) and/or multi-carrier transmission NICs. However, the present invention is not limited to this embodiment and 1G, 2G and 3G and/or any combination thereof, with or with 4G NICs can be used to practice the invention.

In one embodiment of the invention, the WiMAX interfaces includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those on cloud communications networks 18 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee™ is one wireless protocol used on WPAN networks such as cloud communications network 18.

VoIP is a set of facilities for managing the delivery of voice information using IP packets. In general, VoIP is used to send voice information in digital form in discrete data packets (i.e., IP packets) over data networks rather than using traditional circuit-switched protocols used on the PSTN. VoIP is used on both wireless and wired data networks.

VoIP typically comprises several applications (e.g., Session Initiation Protocol (SIP), Service Location Protocol (SLP), H.323, H.324, Domain Name System (DNS), Authentication Authorization and Accounting (AAA), codecs (G.7xx), etc.) that convert a voice signal into a stream of packets (e.g., IP packets) on a packet network and back again. VoIP allows voice signals to travel over a stream of data packets over a communications network.

Short Message Service (SMS) is a text messaging service component of phone, web, or mobile communication systems, using standardized communications protocols that allow the exchange of short text messages of up to 160 characters, or more.

Instant messaging (IM) is a type of messaging which offers real-time text transmission over a local area network (LAN).

The one or more target network devices 12, 14, 16 19-27 and one or more server network devices 20, 22, 24, 26, 29 may communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 19-27, 20, 22, 24, 26, 29 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications and/or non-cloud applications 30, 30' provide cloud social media ecosystem 10 searching services from television services over the cloud communications network 18. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications and/or non-cloud applications 30, 30' provide cloud social media ecosystem 10 search services from Internet television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications and/or non-cloud applications 30, 30' provide cloud social media ecosystem 10 search services from general search engine services. A search engine is designed to search for information on a cloud communications network 18 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30' provide cloud Social media ecosystem 10 search services from general search engine services. In another embodiment, the cloud applications 30, 30' provide general search engine services by interacting with one or more other public search engines (e.g., GOOGLE, BING, YAHOO, etc.) and/or private search engine services.

In another embodiment, the cloud applications 30, 30' provide social media ecosystem 10 search services from specialized search engine services, such as vertical search engine services by interacting with one or more other public vertical search engines (e.g., GALAXY.COM, etc.) and/or private search engine services However, the present invention is not limited to such general and/or vertical search engine services and more, fewer and/or other general search engine services can be used to practice the invention.

Social Networking Services

In one embodiment, the cloud applications and/or non-cloud applications 30, 30' provide cloud social media ecosystem 10 search services from one more social networking services including to/from one or more social networking web-sites (e.g., FACEBOOK, YOUTUBE, TWITTER, MY-SPACE, MATCH.COM, E-HARMONY, GROUP ON, SOCIAL LIVING, PINTEREST, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Music Downloading Services

In one embodiment, the cloud applications and/or non-cloud applications 30, 30' provide cloud social media ecosystem 10 search services from one more music downloading services (e.g., iTunes, Rhapsody, etc.) at one or more music downloading sites.

However, the present invention is not limited to the music downloading services described and other public and private social networking services can also be used to practice the invention.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth™ Forum, or the ADSL Forum.

Security and Encryption

Network devices 12, 14, 16, 19-27, 20, 22, 24, 26, 29 with wired and/or wireless interfaces of the social media ecosystem 10 include one or more of the security and encryptions techniques discussed herein for secure communications on the cloud communications network 18.

Application programs 58 (FIG. 2) include security and/or encryption application programs integral to and/or separate from the cloud applications 30, 30' Security and/or encryption programs may also exist in hardware components on the network devices (12, 14, 16, 19-27, 20, 22, 24, 26, 29) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference.

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
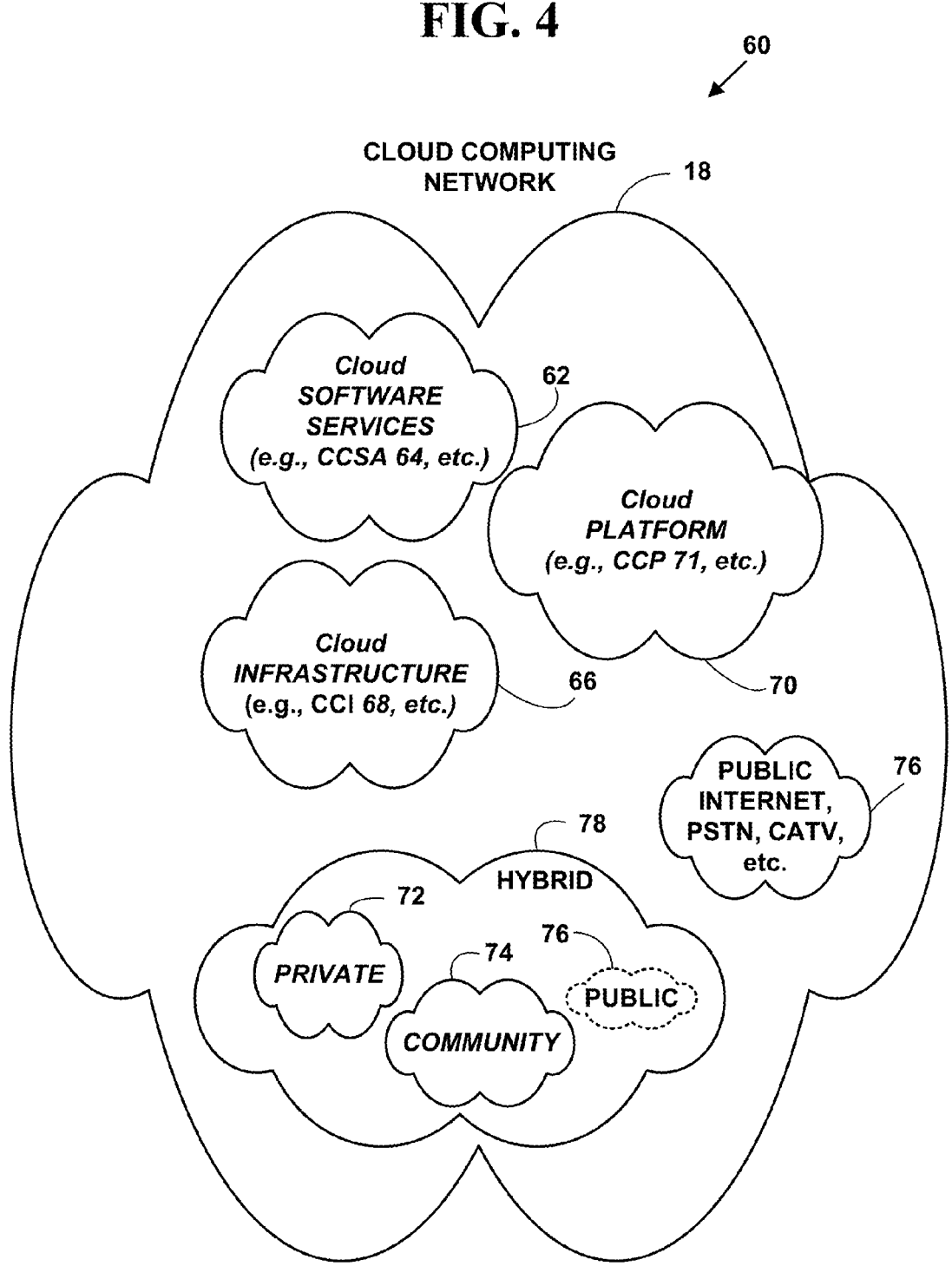
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand social media ecosystem 10 search services. Social media ecosystem searchers and contributors can unilaterally provision computing capabilities, such as server time and network storage, as needed automatically without requiring human interaction with each network server on the cloud communications network 18.
2. Broadband network access. Social media ecosystem searching and contribution capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G and/or 4G wireless and/or wired and broadband and/or ultra-broad band (e.g., WiMAX, etc.) network access.
3. Resource pooling. Social media ecosystem 10 searching and contribution computing resources are pooled to serve multiple requesters using a multi-tenant model, with different physical and virtual resources dynamically assigned and reassigned according to social media ecosystem demand.
There is location independence in that a requester of a search or contribution has no control and/or knowledge over the exact location of the provided by social media ecosystem 10 search resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for the social media ecosystem search. To the social media ecosystem 10 searcher, the social media ecosystem 10 searching and contribution capabilities available for provisioning appear to be unlimited and can be used in any quantity at any time.
5. Measured Services. Cloud computing systems automatically control and optimize resource use by leveraging a metering capability at some level of abstraction appropriate to the type of social media ecosystem 10 services (e.g., storage, processing, bandwidth, custom social media ecosystem 10 searching, etc.). Social media ecosystem 10 searching and contribution usage is monitored, controlled, and reported providing transparency for both the social media search provider and the social media search requester of the utilized social media ecosystem 10 search or contriubtion service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for a social media ecosystem 10 searching and contribution service (CCSA 64). The capability to use the provider's applications 30, 30' running on a cloud infrastructure 66. The cloud computing applications 62, are accessible from the server network device 20 from various client devices 12, 14, 16, 19-27 through a thin client interface such as a web browser, etc. The user does not manage or control the underlying cloud infrastructure 66 including network, servers, operating systems, storage, or even individual application 30, 30' capabilities, with the possible exception of limited user-specific application configuration settings.
2. Cloud Computing Infrastructure 66 for the social media ecosystem 10 searching and contribution service (CCI 68). The capability provided to the user is to provision processing, searching and contribution storage and retrieval, networks 18, 72, 74, 76, 78 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).

TABLE 2-continued

3. Cloud Computing Platform 70 for the social media ecosystem 10 searching and contribution service (CCP 71). The capability provided to the user to deploy onto the cloud infrastructure 66 created or acquired applications created using programming languages and tools supported servers 20, 22, 24, 26, 29, etc. The user not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for social media ecosystem 10 searching and contribution. It may be managed by the electronic content retrieval or a third party and may exist on premise or off premise.
2. Community cloud network 74. The cloud network infrastructure is shared by several different organizations and supports a specific social media ecosystem 10 search and contribution community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.).
5. Cloud network 18. The cloud communications network further includes cable television networks (CATV), satellite television networks (SATV), three-dimensional television (3DTV) networks, Internet television networks, Web-TV networks and/or Internet Protocol Television (IPtv) networks.

Cloud software 64 for electronic content retrieval takes full advantage of the cloud paradigm by being service oriented with a focus on statelessness, low coupling, modularity, and semantic interoperability for social media ecosystem 10 searching services. However, cloud software services 64 can include various states.

Cloud storage of social media ecosystem 10 searching on a cloud computing network 18 includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', offers cloud services for social media ecosystem 10 search and contribution services. The application 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 62 (SaaS) including a specific cloud software service 62 for social media ecosystem 10 search and contribution services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
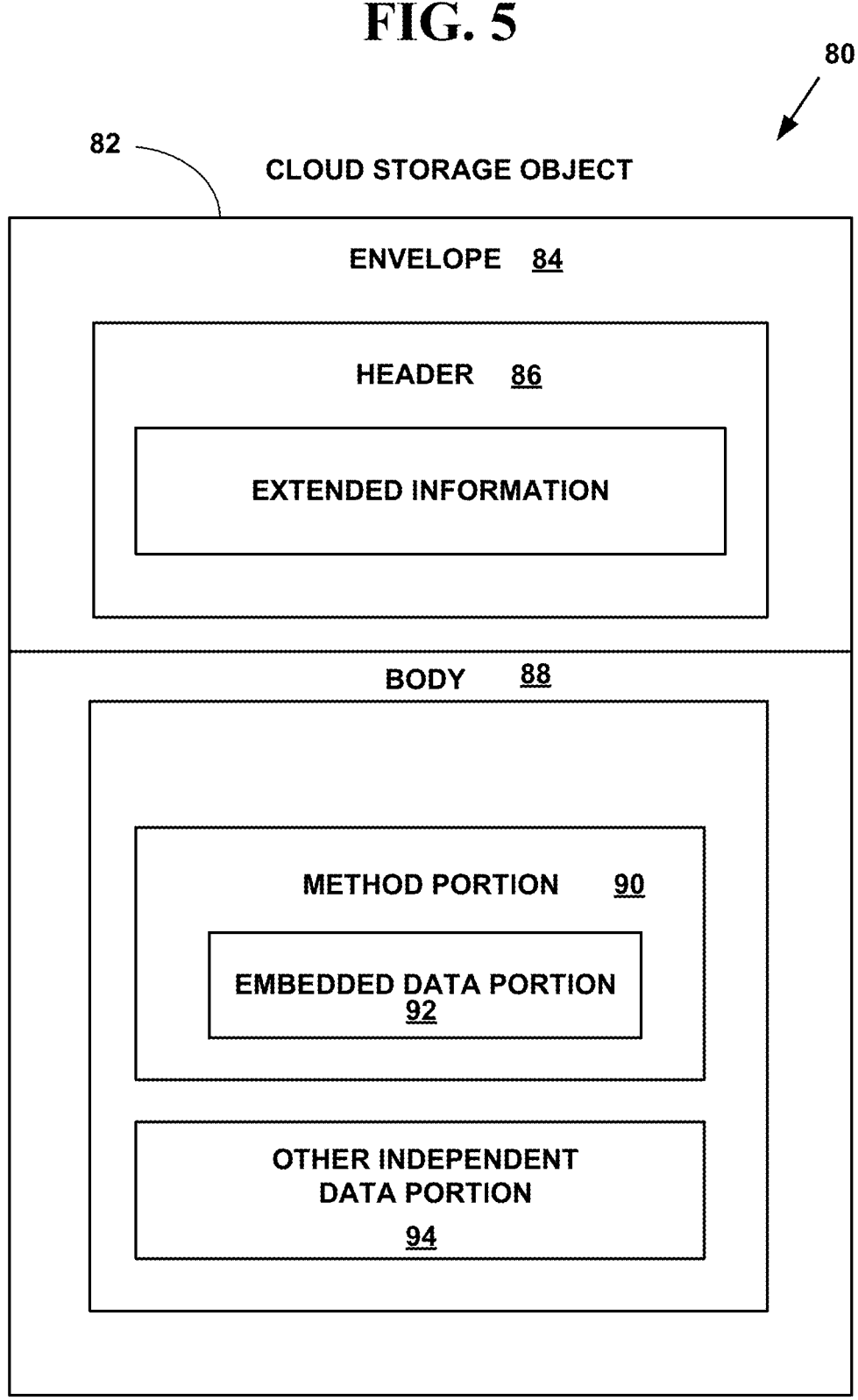
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30'.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Social Media Ecosystem

An "ecosystem" with respect to a communications network 18, is a community of participates (e.g., web page providers, indexers (e.g., search engines, etc.) and searchers in conjunction with the technology components of their environment (e.g., servers, gateways, routers, switches, wired interfaces, wireless interfaces, target network devices, (e.g., smart phones, tablets, etc.), etc.), users of the target network devices interacting as a system. The ecosystem components are regarded as linked together through communications and data flows. Ecosystems are controlled by both internal and external factors.

A "digital social media ecosystem" is a distributed, adaptive, open socio-technical system with properties of self-organization, scalability and sustainability inspired from natural ecosystems. Digital ecosystem models are informed by knowledge of natural ecosystems, especially for aspects related to competition and collaboration among diverse entities.

A social media ecosystem 10 is also a place to present social "needs" and "wants" of a person in social, career or leisure activities, for the benefit of that person and others individuals and businesses that feel that can satisfy that need, after a search, review of a profile and making some type of contribution to the person.

Social Commerce Connections

"Social commerce" is a subset of electronic commerce that involves using social media, online media that supports social interaction, and user contributions to assist in creating social connection as well as the online buying and selling of products and services.

Figure 6:
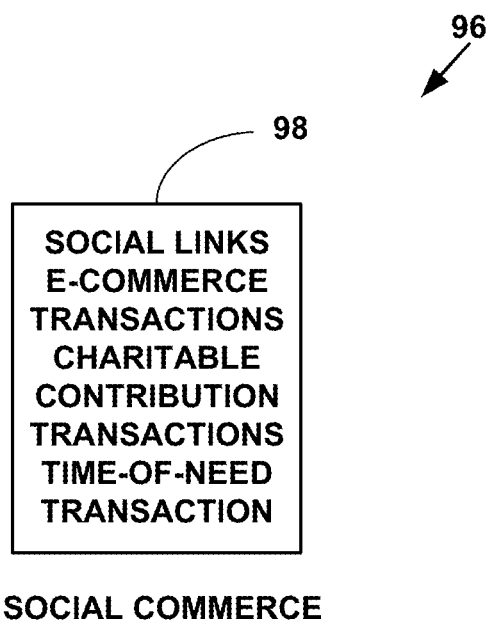
FIG. 6 is a block diagram illustrating an exemplary social commerce connection.

FIG. 6 is a block diagram 96 illustrating an exemplary social commerce connection 98. However, the present invention is not to the social commerce connect described, and more fewer and other types of social commerce connections can be used to practice the invention A social commerce connection 98 is the use of social network(s) for e-commerce transactions, charitable giving transactions and/or time-of-need transactions. Social commerce include online collaborative tools such as shared pick lists, viewing advertising, user ratings and other user-generated content-sharing of online goods and services information and advice.

Examples of social commerce include, but are not limited to, customer ratings and reviews, user recommendations and referrals, social shopping tools (e.g., sharing the act of shopping online, etc.), forums and communities, social media optimization, social applications and social advertising.

One way to categorize social commerce is Offsite and Onsite social commerce. "Offsite social commerce" includes activities that happen outside of a good or service provider's website. These may include electronic storefronts, posting products on FACEBOOK, TWITTER, PINTEREST and other social networks, advertisement etc. However, many large brands seem to be abandoning that approach. The poor performance has been attributed to the lack of purchase intent when users are engaged on social media sites which were designed to interact with other people and not to purchase products.

"Onsite social commerce" refers to retailers including social sharing and other social functionality on their website. Some notable examples include ZAZZLE which enables users to share their purchases, MACY'S which allows users to create a poll to find the right product, and FAB.COM which shows a live feed of what other shoppers are buying. Onsite user reviews are also considered a part of social commerce.

The 2011 BankInter Foundation for Innovation conference on Social Technologies discussed six C's of Social Technologies including content, community, commerce, context, connection and conversation.

Content—The basic need to engage with customers, prospects and stakeholders through valuable published content on the web. Early examples of this were the brochure sites for organizations and this has matured into a vast and growing body of material being published in real time onto the web. GOOGLE and UNITTUS are organizations that have been at the forefront of indexing and making findable content on the web.

Community—Treating the audience as a community with the objective of building sustainable relationships by providing tangible value. Early incarnations of Community were mobilized through registration and engaged via email programs, this evolved into online forums, chat-rooms and membership groups where users were able to interact with each other, an early example being YAHOO GROUPS. Social Networks are the latest incarnation of community and of the many networks FACEBOOK and TWITTER are the leading organization providing the platform for interpersonal interactions.

Commerce—Being able to fulfill customers' needs via a transactional web presence, typically online retailers, banks, insurance companies, travel sales sites provide the most useful business-to-consumer services. Business-to-business sites range from online storage and hosting to product sourcing and fulfillment services. AMAZON.com emerged in the 90's and has gone on to dominate the B2C commerce space extending its services beyond traditional retail commerce.

Context—The online world is able to track real-world events and this is primarily being enabled by mobile devices. An online bill payment via Google Checkout or a check in at a physical location via FACEBOOK or FOURSQUARE links a real world event to an online data entity such as a business or a place. This is a vital element to Social Commerce where the data is now available to organizations wishing to provide products and services to consumers.

Connection—The new online networks are defining and documenting the relationships between people—these relationships may originate in the physical world or online and may manifest in the other as a result of a connection in the first. LINKEDIN, FACEBOOK, TWITTER and UNITTUS are prime examples of online networks—Professional, Social and Casual. The relationships, the scope of those relationships and the interactions between individuals are a basis for the actions of Social Commerce. UNITUS uWorld Community includes search, connect, communicate and prosper together, instantly with an open public format, so people can connect with and individual or the community at large instantly.

Conversation—All markets are conversations—this may now be reversed for Social Commerce to say that all conversations are markets. A conversation between two parties will likely surface a need that could be fulfilled, thus providing a potential market for supplier organizations. The challenge is for suppliers to be able to tap into those conversations and map those into the range of products and services that they supply. Simple examples of such 'conversations that indicate demand' are where people place objects of desire on their PINTERST board, a "LIKE" of an item inside FACEBOOK or re-tweeting a TWEET on TWITTER.

The elements of social commerce include but are not limited to, reciprocity, community, social proof, authority, liking and scarcity.

Reciprocity—When a company gives a person something for free, that person will feel the need to return the favor, whether by buying again or giving good recommendations for the company.

Community—When people find an individual or a group that shares the same values, likes, beliefs, etc., they find community. People are more committed to a community that they feel accepted within. When this commitment happens, they tend to follow the same trends as a group and when one member introduces a new idea or product, it is accepted more readily based on the previous trust that has been established Social proof—To receive positive feedback, a company needs to be willing to accept social feedback and to show proof that other people are buying, and like, the same things that I like. This can be seen in a lot of online companies such as eBay and Amazon, that allow public feedback of products and when a purchase is made, they immediately generate a list showing purchases that other people have made in relation to my recent purchase. It is beneficial to encourage open recommendation and feedback. This creates trust for you as a seller. 55% of buyers turn to social media when they're looking for information.

Authority—Many people need proof that a product is of good quality. This proof can be based on the recommendations of others who have bought the same product. If there are many user reviews about a product, then a consumer will be more willing to trust their own decision to buy this item.

Liking—People trust based on the recommendations of others. If there are a lot of "likes" of a particular product, then the consumer will feel more confident and justified in making this purchase.

Scarcity—If a person is convinced that they are purchasing something that is unique, special, or not easy to acquire, they will have more of a willingness to make a purchase. If there is trust established from the seller, they will want to buy these items immediately. This can be seen in the cases of ZARA and APPLE who create demand for their products by convincing the public that there is a possibility of missing out on being able to purchase them.

In a social commerce and social media ecosystem everybody is connected from a economic/financial standpoint regardless of how they became a member. Everything they do would have a financial connection to others within the platform on a global basis.

Social Media Ecosystem My Favorite Things Information Creation and Searching

Figure 7B:
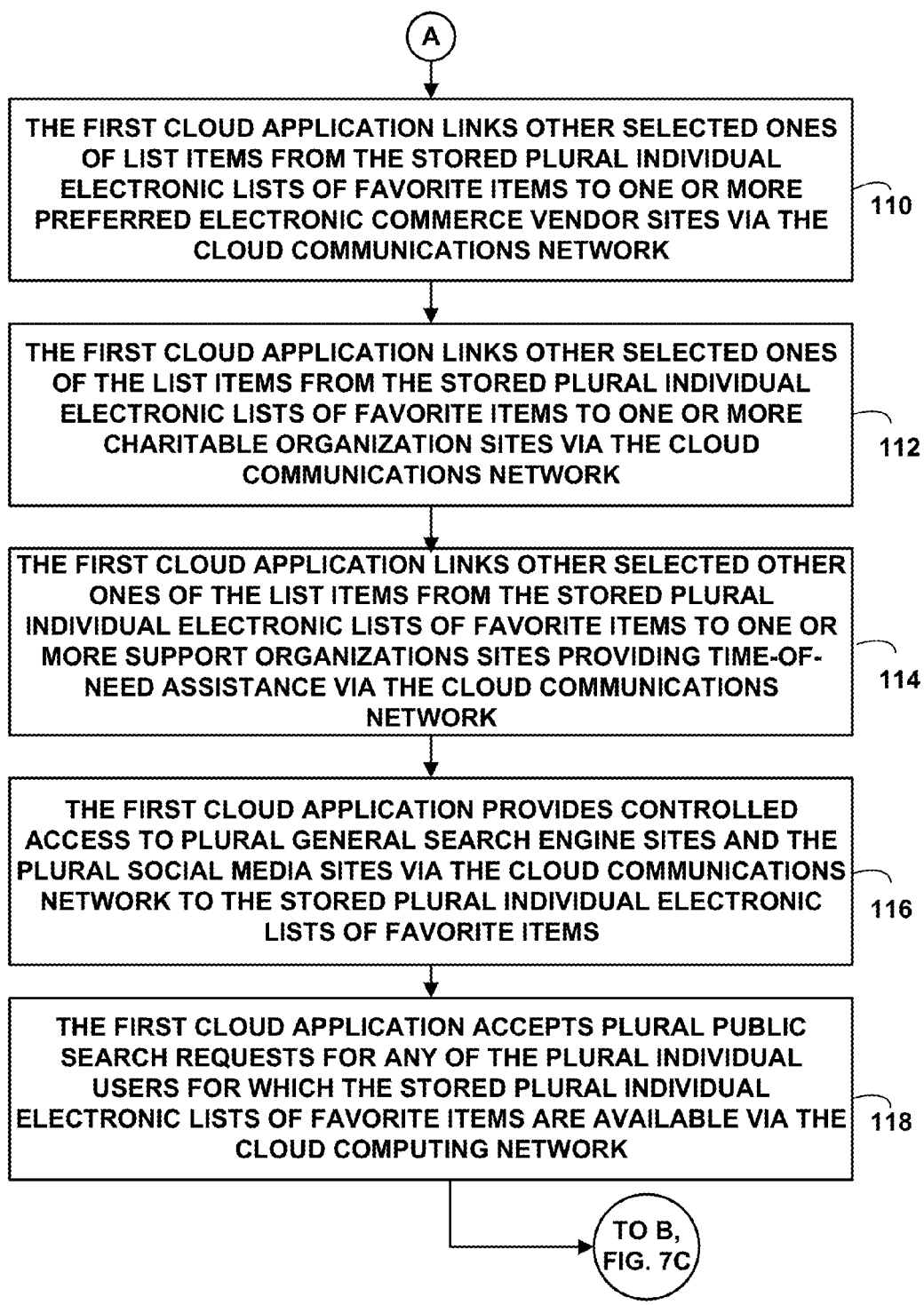
Figure 7C:
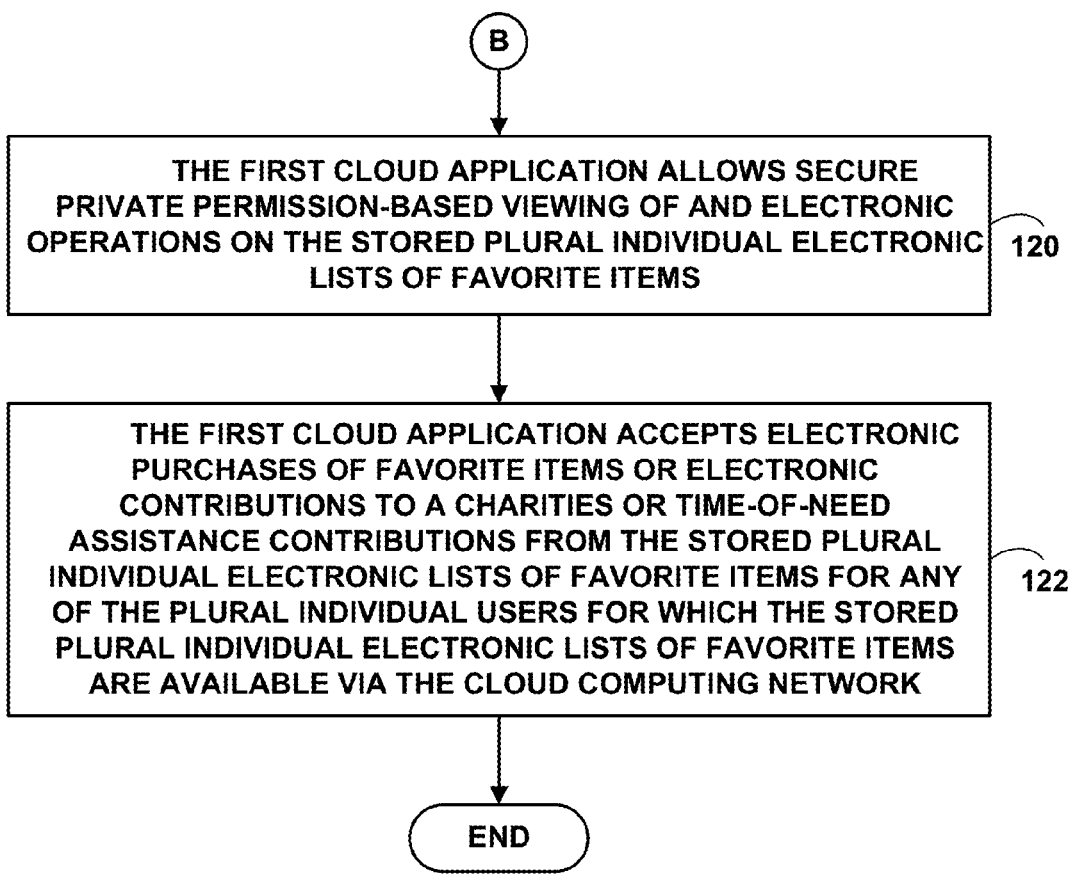

FIGS. 7A, 7B and 7C are a flow diagram illustrating a Method 100 for social media ecosystem searching and contributing. In FIG. 7A at Step 102, on a social media ecosystem, a first cloud application stored in a first non-transitory computer readable medium on a cloud server network device with the one or more processors via a cloud communications network comprising: one or more public communication networks, one or more private networks, one or more community networks and one or more hybrid networks, receives plural sets of personal electronic information from plural of target applications on plural target network devices each with one or more processors operated by plural individual users. At Step 104, the first cloud application extracts from the received plural sets of personal electronic information into plural individual electronic lists of favorite items. At Step 106, the first cloud application stores the extracted plural individual electronic lists of favorite items in plural cloud storage objects on the cloud communications network. At Step 108, the first cloud application links selected ones of list items from the stored plural individual electronic lists of favorite items to one or more social media sites in the social media ecosystem via the cloud communications network. In FIG. 7B, at Step 110, the first cloud application links other selected ones of list items from the stored plural individual electronic lists of favorite items to one or more preferred electronic commerce vendor sites via the cloud communications network. At Step 112, the first cloud application links other selected ones of the list items from the stored plural individual electronic lists of favorite items to one or more charitable organization sites via the cloud communications network. At Step 114, the first cloud application links other selected other ones of the list items from the stored plural individual electronic lists of favorite items to one or more support organizations sites providing time-of-need assistance via the cloud communications network. At Step 116, the first cloud application provides controlled access to plural general search engine sites and the plural social media sites via the cloud communications network to the stored plural individual electronic lists of favorite items. At Step 118, the first cloud application accepts plural public search requests for any of the plural individual users for which the stored plural individual electronic lists of favorite items are available via the cloud computing network. In FIG. 7C, at Step 120, the first cloud application allows secure private permission-based viewing of and electronic operations on the stored plural individual electronic lists of favorite items. At Step 122, the first cloud application accepts electronic purchases of favorite items or electronic contributions to a charity or time-of-need assistance from the stored plural individual electronic lists of favorite items for any of the plural individual users for which the stored plural individual electronic lists of favorite items are available via the cloud computing network.

Method 100 is illustrated with an exemplary embodiment. However, the present invention is not limited to this exemplary embodiment, and other embodiments can be used to practice the invention.

In such an exemplary embodiment in FIG. 7A, at Step 102, on a social media ecosystem 10, a first cloud application 30' stored in a first non-transitory computer readable medium on a cloud server network device 20 with the one or more processors via a cloud communications network 18 comprising: one or more public communication networks 76, one or more private networks 72, one or more community networks 74 and one or more hybrid networks 78, receives plural sets of personal electronic information 13, 15 from plural of target applications 30 on plural target network devices 12, 14, 16, 17-27 each with one or more processors operated by plural individual users.

In one embodiment, the plural sets of personal electronic information 13, 15 includes basic personal information including but not limited to, a user name, street address, dates of special events (e.g., birthday, anniversary, etc.), names of family members, names of friends and/or names of business associates who know the user, etc. However, the present invention is not limited to this embodiment and more, fewer and/or types of personal electronic information 13, 15 can be used to practice the invention.

In one embodiment, the plural sets of personal electronic information 13, 15 also include personal preference information comprising plural categories for user, preferences, including but not limited to, types of greeting cards, flowers, gift cards, gift certificates, gift baskets, home décor, fashion including style, color, size, designer, etc., jewelry, floral arrangements, hobbies, wine, liquor, e-commerce sites, etc. However, the present invention is not limited to this embodiment and more, fewer and/or types of personal electronic information 13, 15 can be used to practice the invention.

In one embodiment, the plural sets of personal electronic information 13, 15 also includes user favorites, including but not limited to, favorite restaurants, sport teams, stores, spas, gas stations, dry cleaners, movie theaters, entertainment (e.g., opera, plays, etc.) delivery services (e.g., grocery, etc.), etc. However, the present invention is not limited to this embodiment and more, fewer and/or types of personal electronic information 13, 15 can be used to practice the invention.

At Step 104, the first cloud application 30' extracts from the received plural sets of personal electronic information 13, 15 into plural individual electronic lists of favorite items 13', 15'.

In one embodiment, Step 104 includes extracting the plural individual electronic lists of favorite items 13', 15' into pre-determined categories that will assist gift givers, contributors to charities and/or time-of-need contributors. However, the present invention is not limited to this embodiment and more, fewer and other types of electronic lists can be used to practice the invention.

At Step 106, the first cloud application 30' stores the extracted plural individual electronic lists of favorite items 13', 15' in plural cloud storage objects 13'/82, 15'/82 on the cloud communications network 18.

In one embodiment, the plural cloud storage objects 13'/82, 15'/82 include Representational state transfer (REST), Simple Object Access Protocol (SOAP), and/or Lightweight Directory Access Protocol (LDAP) cloud storage objects. However, the present invention is not limited to this embodiment and more, fewer and other types of cloud storage object protocols can be used to practice the invention.

At Step 108, the first cloud application 30' links selected ones of list items from the stored plural individual electronic lists of favorite items 13'/82, 15'/82 to one or more social media sites 22 in the social media ecosystem 10 via the cloud communications network 18. This provides public, but controlled access to the stored plural individual electronic lists of favorite items 13'/82, 15'/82.

In one embodiment, the social media sites 22 include, but are not limited to, FACEBOOK, YOUTUBE, TWITTER, MY-SPACE, MATCH.COM, E-HARMONY, GROUP ON, SOCIAL LIVING, PINTEREST, etc. web-sites. The social networking web-sites also include, but are not limited to, social couponing sites, dating web-sites, blogs, RSS feeds, and other types of information web-sites in which messages can be left or posted for a variety of social activities. However, the present invention is not limited these social networking sites and more, fewer and/or other types of social network networking sites 22 can be used to practice the invention.

In one embodiment, the social media sites can become preferred social media sites 22 by entering into a contract with an organization 20 providing the stored plural individual electronic lists of favorite items 13'/82, 15'/82. Such contracts provide revenue to the organization 20. However, the present invention is not limited to such an embodiment and other embodiments can be used to practice the invention.

In FIG. 7B, at Step 110, the first cloud application 30' links other selected ones of list items from the stored plural individual electronic lists of favorite items 13'/82, 15'/82 to one or more preferred electronic commerce vendor sites 24 via the cloud communications network 18.

In one embodiment, electronic commerce vendors become preferred electronic commerce vendors by entering into a contract with an organization 20 providing stored plural individual electronic lists of favorite items 13'/82, 15'/82. Such contracts provide revenue to the organization 20. In such an embodiment, at Step 110, if a user likes to read books, a preferred electronic commerce vendor may include a link to barnesandnoble.com instead of amazon.com, both of which sell books, because barnesandnoble.com is a preferred vendor and amazon.com is not, etc. However, the present invention is not limited to such an embodiment and other embodiments, with and/or without preferred vendors, may be used to practice the invention.

In another embodiment a user who provided the personal electronic information 13, 15 is allowed to select preferred electronic commerce vendors. However, the present invention is not limited to such an embodiment and other embodiments may be used to practice the invention.

At Step 112, the first cloud application 30' links other selected ones of the list items from the stored plural individual electronic lists of favorite items 13'/82, 15'/82 to one or more charitable organization sites 26 via the cloud communications network 18.

In one embodiment, a first user who provided the personal electronic information 13, 15 is allowed to select their preferred charitable organizations 26 that will receive a contribution should the first user not desire to receive a personal gift and/or because a second user has decided to make a charitable contribution instead of sending a personal gift to the first user. The first user may also designate a one-time preference for which charitable contribution be made. For example, if a loved one of the first user dies, the first user may request charitable contributions be made to a charity instead of other users sending flowers to the funeral, etc. However, the present invention is not limited to such an embodiment and other embodiments may be used to practice the invention.

In one embodiment, a charitable organization 26 can become a preferred charitable organizations 26 by entering into a contract with an organization 20 providing the stored plural individual electronic lists of favorite items 13'/82, 15'/82. Such contracts provide revenue to the organization 20. In such an embodiment, a preferred charitable organization may be suggested by first cloud application 30' if a first user has not designated any charitable organizations and a second user desires to make a charitable contribution for the first user. However, the present invention is not limited to such an embodiment and other embodiments, with and/or without preferred charitable organizations, can be used to practice the invention.

At Step 114, the first cloud application 30' links other selected other ones of the list items from the stored plural individual electronic lists of favorite items 13'/82, 15'/82 to one or more support organizations sites 29 providing time-of-need assistance via the cloud communications network.

In one embodiment, the plural support organizations sites 29, include but are not limited to, food pantries, RED CROSS, churches, temples, etc. organizations. However, the present invention is not limited to such an embodiment and other embodiments may be used to practice the invention.

In one embodiment, a user is able to designate they are in a time-of-need due to an unexpected life event such as death, illness, a natural disaster (e.g., flood, fire, hurricane, tornado, earthquake, mud-slide, etc.), loss of job, disability, etc. In such an embodiment, other users can then make a contribution and/or donation to a preferred support organization (e.g., the first user's church, etc.) that can assist the first user directly and in a personal manner. In one embodiment, a user is able to disable and/or selective turn on and off viewing of personal preferences and/or charitable contribution preferences during a time-of-need. However, the present invention is not limited to such embodiments and other embodiments may be used to practice the invention.

In one embodiment, at Step 108-114, if a user has not designated any electronic commerce vendor sites 24, support charitable organization sites 26, and/or organization sites 29, the first cloud application includes at least one default link (i.e., that can be a preferred or non-preferred choice, etc.). However, the present invention is not limited to such an embodiment and other embodiments may be used to practice the invention.

At Step 116, the first cloud application 30' provides controlled access to plural general search engine sites and the plural social media sites 22 via the cloud communications network 18 to the stored plural individual electronic lists of favorite items 13'/82, 15'/82.

In one embodiment, the controlled access is provided by allowing a user to determine what other users will have access to their individual electronic lists of favorite items 13'/82, 15'/82, which list items can be viewed, which list items can be operated on (e.g., purchases, contributions, etc.). However, the present invention is not limited to such an embodiment and other embodiments may be used to practice the invention.

In one embodiment, controlled access is provided by required other users to create a login on the cloud server network device 20 to access individual electronic lists of favorite items 13'/82, 15'/82. In another embodiment, other users are required to send an access request, (e.g., similar to a FACEBOOK, friend request, etc.) to view the first user's individual electronic lists of favorite items 13'/82, 15'/82. The first user can accept or reject the access request. The first user can also selectively allow access to only selected ones individual electronic lists of favorite items 13'/82, 15'/82 (e.g., allow access only to a list of charitable organization, only to the time-of-need organizations, etc.). However, the present invention is not limited to such an embodiment and other embodiments may be used to practice the invention.

In one embodiment, controlled access is provided to stored plural individual electronic lists of favorite items 13'/82, 15'/82 via a web-site on a cloud server network device 20 on the cloud communications network 18 and/or via smart applications 30 and/or social media applications 30. However, the present invention is not limited to such an embodiment and other embodiments may be used to practice the invention.

At Step 118, the first cloud application 30' accepts plural public search requests for any of the plural individual users for which the stored plural individual electronic lists of favorite items 13'/82, 15'/82 are available via the cloud computing network 18.

In one embodiment, the public search requests include, but are not limited to, search engine searches (e.g., GOOGLE, BING, etc.), searches from social media sites (e.g., FACEBOOK, TWITTER, etc.). However, the present invention is not limited to such an embodiment and other embodiments may be used to practice the invention.

In FIG. 7C, at Step 120, the first cloud application 30' allows secure private permission-based viewing of and electronic operations on, the stored plural individual electronic lists of favorite items 13'/82, 15'/82 (e.g., with the login and/or various permissions set by a user described for Step 116, etc.).

In one embodiment, the first cloud application 30' allows secure private permission-based viewing of and electronic operations on, the stored plural individual electronic lists of favorite items 13'/82, 15'/82 with any individual and/or combination of the security and/or encryption methods described above. In another embodiment, the private permission-based viewing is allowed on without using any security and/or encryption methods. However, the present invention is not limited to such an embodiment and other embodiments may be used to practice the invention.

In one embodiment, a user is able to disable and/or selective turn on and off viewing of personal preferences and/or charitable contribution preferences and/or time-of-need preferences. However, the present invention is not limited to such an embodiment and other embodiments may be used to practice the invention.

At Step 122, the first cloud application 30' accepts electronic purchases of favorite items or electronic contributions to charities or time-of-need assistance contributions from the stored plural individual electronic lists of favorite items 13'/82, 15'/82 for any of the plural individual users for which the stored plural individual electronic lists of favorite items 13'/82, 15'/82 are available via the cloud computing network 18.

Figure 11:
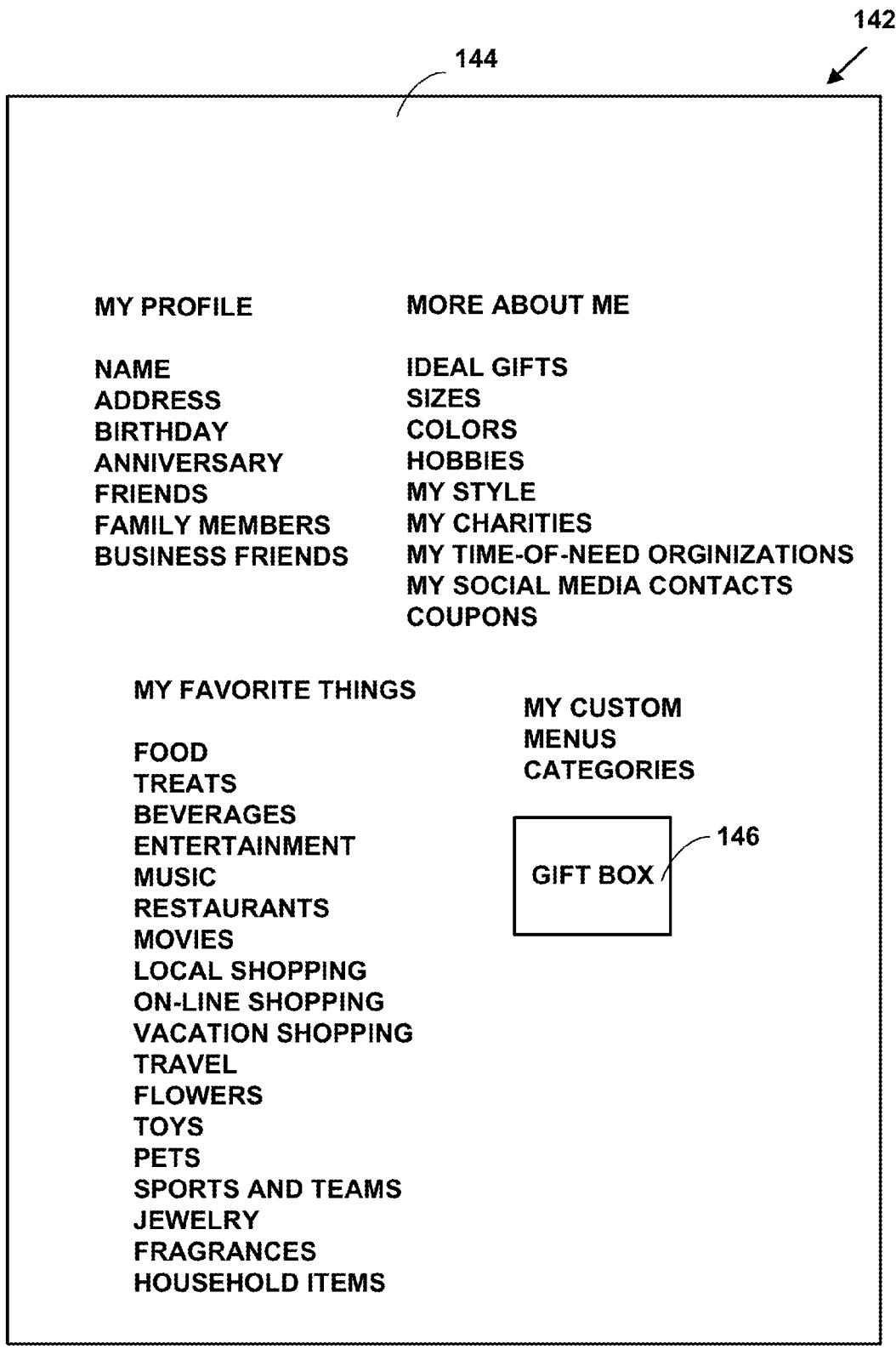
FIG. 11 is a block diagram illustrating an exemplary electronic form for inputting electronic information social media ecosystem search and contributing.

In one embodiment, the first cloud application 30' accepts the electronic purchases stored in one or more electronic gift box graphic icons 146 (FIG. 11). However, the present invention is not limited to such an embodiment, and other embodiments can be used to practice the invention.

FIG. 8 is a flow diagram illustrating a Method 123 for social media ecosystem searching and contributing. At Step 124, determining from the first cloud application whether a selected user of a selected target network device has included a time-of-need assistance request in a list items from the stored plural individual electronic lists of favorite items received from the selected target network device. If at Step, 124, the selected user is in a time-of-need, at Step 126, the first cloud application automatically sends via the cloud communications network one or more first messages to the one or more support organization sites linked to the stored plural individual electronic lists of favorite items received from the selected target network device for the selected user indicating the selected user is in a time-of-need. At Step 128, the first cloud application automatically sends via the cloud communications networks one or more second messages to the one or more social media sites linked to the stored plural individual electronic lists of favorite items received from the selected target network device for the selected user indicating the selected user is in a time-of-need.

Method 123 is illustrated with an exemplary embodiment. However, the present invention is not limited to this exemplary embodiment, and other embodiments can be used to practice the invention.

In such an exemplary embodiment in at Step 124, a test is conducted from the first cloud application 30' to determine whether a selected user of a selected target network device 12 has included a time-of-need assistance request in a list items from the stored plural individual electronic lists of favorite items 13'/82 received from the selected target network device 12.

If at Step, 124, the selected user is in a time-of-need, at Step 126, the first cloud application 30' automatically sends via the cloud communications network 18 one or more first messages to the one or more support organization sites 29 linked to the stored plural individual electronic lists of favorite items received from the selected target network device for the selected user indicating the selected user is in a time-of-need. This provides the opportunity for the selected user to automatically be provided the opportunity in a time-of-need. In some instances, the selected user may not be able (e.g., sick, injured, unable to communicate, etc.) or not willing (e.g., too proud, scared, etc.) to ask for assistance when they need it. Sending messages automatically to the one or more support sites 29 increases the opportunities that the selected user will receive the assistance they need. However, the present invention is not limited to this embodiment, and other embodiments can be used to practice the invention.

At Step 128, the first cloud application 30' automatically sends via the cloud communications network 18 one or more second messages to the one or more social media sites 22 linked to the stored plural individual electronic lists of favorite items 13'/82 received from the selected target network device 12 for the selected user indicating the selected user is in a time-of-need. In some instances, the selected user may not be able or not willing to ask for assistance when they need it. Sending messages to their friends, relatives, etc. on the one or more social media sites 22 increases the opportunities that the selected user will receive the assistance they need from their friends, relatives, etc. However, the present invention is not limited to this embodiment, and other embodiments can be used to practice the invention.

Figure 9:
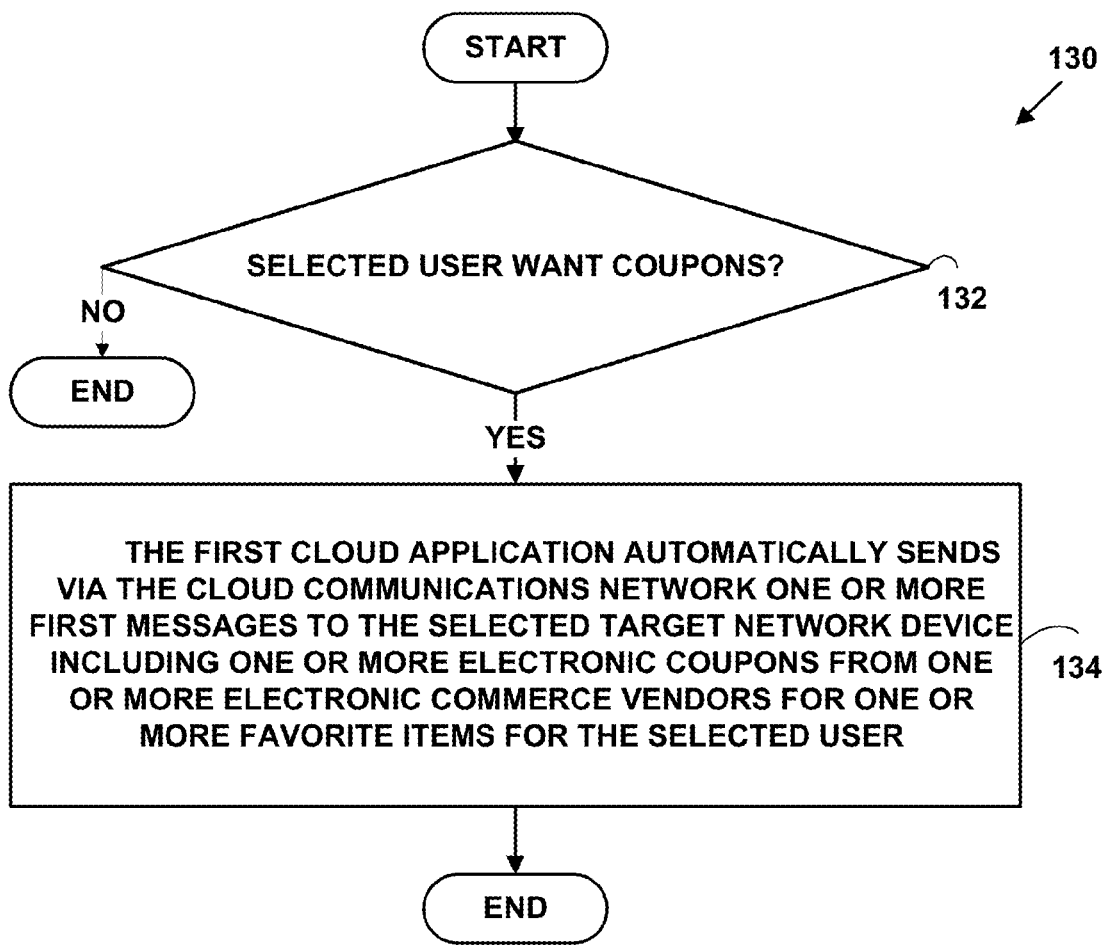
FIG. 9 is a flow diagram illustrating a method for social media ecosystem search and contributing.

FIG. 9 is a flow diagram illustrating a Method 130 for social media ecosystem searching and contributing. At Step 132, the first cloud application determines whether a selected user of a selected target network device has included a coupon request in a list item from the stored plural individual electronic lists of favorite items received from the selected target network device. If at Step 132, the first cloud application determines a selected user wants coupons, at Step 134, the first cloud application automatically sends via the cloud communications network one or more first messages to the selected target network device including one or more electronic coupons from one or more electronic commerce vendors for one or more favorite items for the selected user.

Method 130 is illustrated with an exemplary embodiment. However, the present invention is not limited to this exemplary embodiment, and other embodiments can be used to practice the invention.

In such an exemplary embodiment at Step 132, the first cloud application 30' conducts a test to determine whether a selected user of a selected target network device 12 has included a coupon request in a list item from the stored plural individual electronic lists of favorite items 13'/82 received from the selected target network device 12.

If at Step 132, the first cloud application 30' does determine a selected user wants coupons, at Step 134, the first cloud application 30' automatically sends via the cloud communications network 18 one or more first messages to the selected target network device 12 including one or more electronic coupons from one or more electronic commerce vendors 24 for one or more favorite items for the selected user.

In one embodiment, the electronic coupons are for preferred electronic commerce vendors 24 that have contracts with the organization 20. In another embodiment, the electronic coupons are for favorite electronic commerce vendors 24 selected the selected user. In another embodiment, the electronic coupons are a combination thereof of preferred electronic commerce vendors and favorite electronic vendors. However, the present invention is not limited to these embodiments, and other embodiments can be used to practice the invention.

Figure 10:
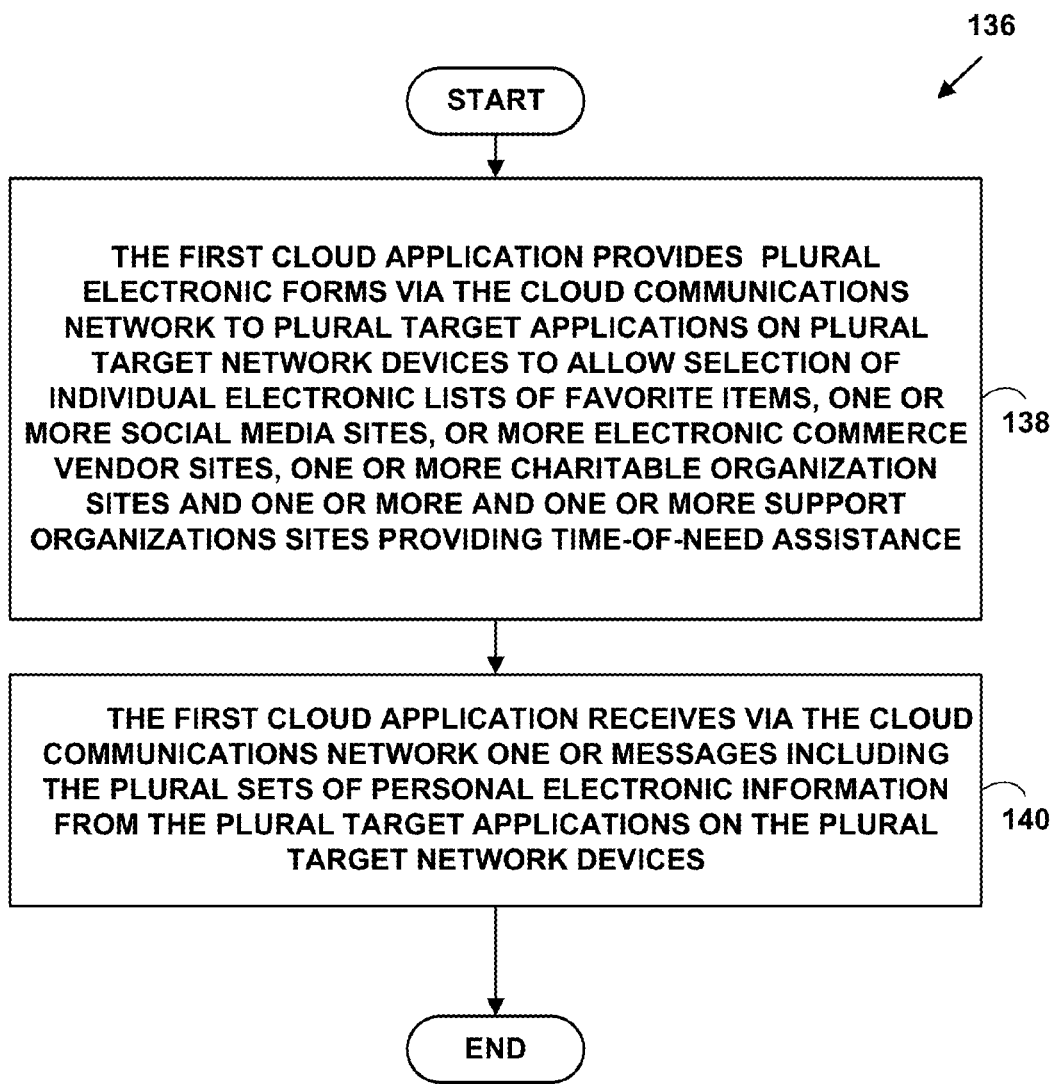
FIG. 10 is a flow diagram illustrating a method for social media ecosystem search and contributing.

FIG. 10 is a flow diagram illustrating a Method 136 for social media ecosystem search and contributing. At Step 138, the first cloud application provides plural electronic forms via the cloud communications network to plural target applications on plural target network devices to allow selection of individual electronic lists of favorite items, one or more social media sites, or more electronic commerce vendor sites, one or more charitable organization sites and one or more and one or more support organizations sites providing time-of-need assistance. At Step 140, the first cloud application receives via the cloud communications network one or messages including the plural sets of personal electronic information from the plural target applications on the plural target network devices.

Method 136 is illustrated with an exemplary embodiment. However, the present invention is not limited to this exemplary embodiment, and other embodiments can be used to practice the invention.

In such an exemplary embodiment at Step 138, the first cloud application 30' provides plural electronic forms 144 via the cloud communications network 18 to plural target applications 30 on plural target network devices 12, 14, 16, 19-27 to allow selection of individual electronic lists of favorite items, one or more social media sites, or more electronic commerce vendor sites, one or more charitable organization sites and one or more and one or more support organizations sites providing time-of-need assistance.

At Step 140, the first cloud application 30' receives via the cloud communications network 18 one or messages including plural sets of personal electronic information 13, 15 from the plural target applications 30 on the plural target network devices 12, 14, 16, 19-27.

FIG. 11 is a block diagram 142 illustrating an exemplary electronic form 144 for inputting electronic information social media ecosystem search and contributing. FIG. 11 illustrates only one of the plural electronic forms 144 for simplicity. In one embodiment, the electronic form 144 includes plural drop down menus in a pre-determined hierarchy to allow a user to make selections. In another embodiment, the electronic form includes a selection that allows the selected user to create their own custom menus and own custom categories (e.g., adding turtles to a pet category that did not include turtles, etc.).

In one embodiment, the electronic form 144 includes a graphical gift box icon 146 to which purchases of favorite items and/or time-of-need contributions and/or charitable contributions can added.

However, the present invention is not limited to this exemplary form 144, and other embodiments, with more, fewer and other fields and descriptions can be used to practice the invention.

Figure 12:
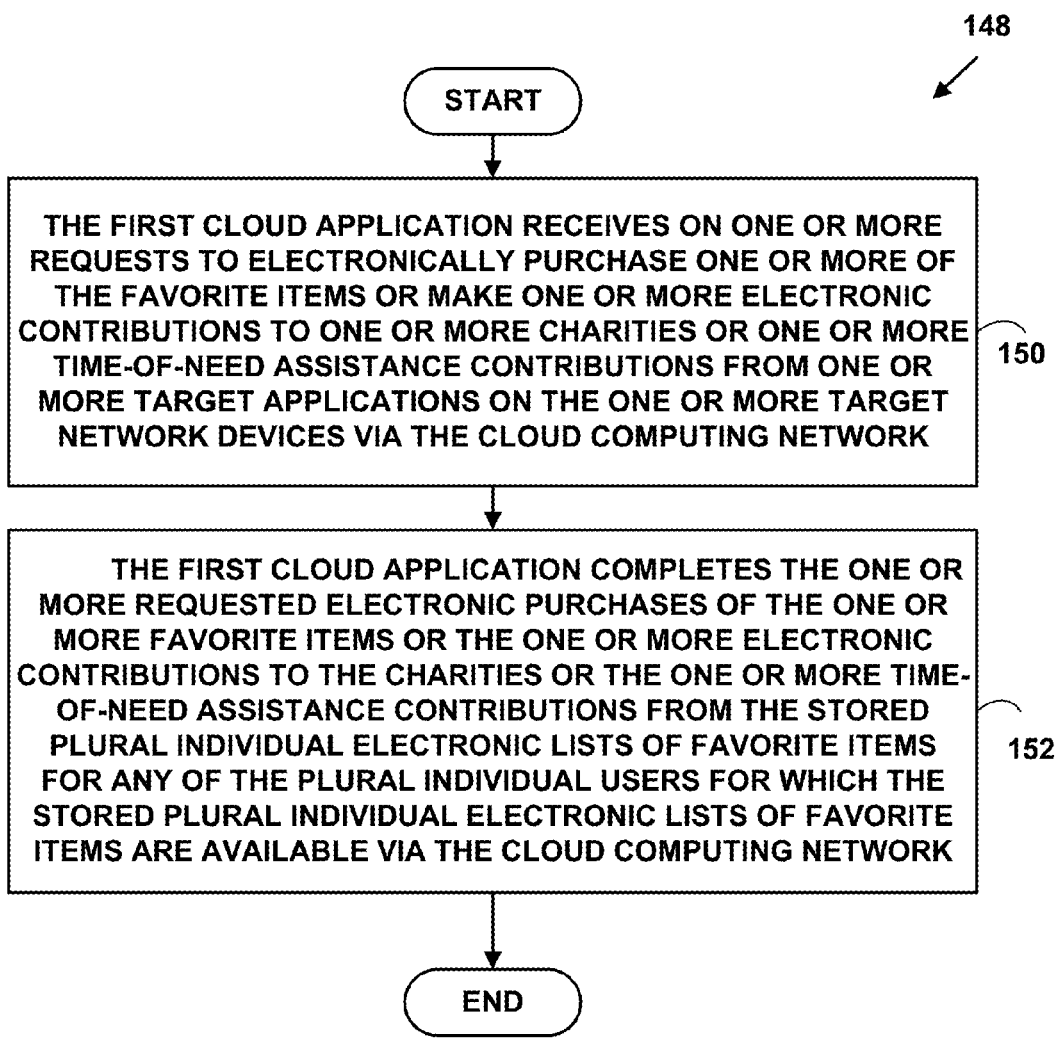
FIG. 12 is a flow diagram illustrating a method for social media ecosystem search and contributing.

FIG. 12 is a flow diagram illustrating a Method 148 for social media ecosystem search and contributing. At Step 150, the first cloud application receives on one or more requests to electronically purchase one or more of the favorite items or make one or more electronic contributions to one or more charities or one or more time-of-need assistance contributions from one or more target applications on the one or more target network devices via the cloud computing network. At Step 152, the first cloud application completes the one or more requested electronic purchases of the one or more favorite items or the one or more electronic contributions to the charities or the one or more time-of-need assistance contributions from the stored plural individual electronic lists of favorite items for any of the plural individual users for which the stored plural individual electronic lists of favorite items are available via the cloud computing network.

Method 148 is illustrated with an exemplary embodiment. However, the present invention is not limited to this exemplary embodiment, and other embodiments can be used to practice the invention.

In such an exemplary embodiment at Step 150, the first cloud application 30' receives on one or more requests to electronically purchase one or more of the favorite items 13'/82, 15'/82 or make one or more electronic contributions to one or more charities or one or more time-of-need assistance contributions from one or more target applications 30 on the one or more target network devices 12, 14, 16, 19-27 via the cloud computing network 18.

In one embodiment, the first cloud application 30' receives the one or more requests from electronic information stored in one or more electronic gift box graphic icons 146 (FIG. 11). However, the present invention is not limited to such an embodiment, and other embodiments can be used to practice the invention.

At Step 152, the first cloud application 30' completes the one or more requested electronic purchases of the one or more favorite items or the one or more electronic contributions to the one or more charities or the one or more time-of-need assistance contributions from the stored plural individual electronic lists of favorite items for any of the plural individual users for which the stored plural individual electronic lists of favorite items 13'/82, 15'/82 are available via the cloud computing network 18.

The methods and system presented herein have been described with respect to cloud communications networks. However, the present invention is not limited to such embodiments and the invention can be practiced on non-cloud communications networks as well.

Presented herein is a method and system for social media ecosystem searching and contributing. A desired person can be searched for from public search engines and social media sites directly by name and/or a social commerce connection associated with the desired person. The search results are publically viewable. However, contributions the desired person located within the social media ecosystem is via a private system in which a searcher must provide login information and/or other access information to privately contribute to the desired person. The private system helps ensure that social commerce connections are properly established, recorded and updated for the desired person and provides a layer of security and privacy. The social media searching and contribution ecosystem is provided on a cloud communications network for mobile and non-mobile devices.

The method and system describe herein provide searching and contributing via social commerce within a social media ecosystem. A user is able to select as plural individual electronic lists, personal preferences and favorite items for social media ecosystem gifting, charitable contributing and time-of-need donating. Controlled access for the plural individual electronic lists selected by the user is provided to plural general search engine sites and plural social media sites in a social media ecosystem. Secure private permission-based viewing of and electronic operations on the stored plural individual electronic lists of favorite items is provided to plural other users so the plural other users can view and contribute a gift, charitable contribution or time-of-need donation.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software in a non-transitory computer readable medium executing on one or more processors, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

We claim:

1. A method for social media ecosystem searching and contributing, comprising:

creating a social media ecosystem for searching and contributing on a plurality of cloud server network devices each with one or more processors on a cloud communications network, a plurality of pooled cloud hardware resources comprising: (1) automatic provisioning of the plurality of pooled cloud hardware resources as needed and available via the plurality of cloud broadband network access components on the plurality of cloud server network devices, (2) automatic scaling of the plurality of pooled cloud hardware resources to obtain and release one or more of the plurality of pooled cloud hardware resources as required, (3) automatic controlling and optimizing the pooled cloud hardware resources with a metering method, and (4) a plurality of cloud software services for automated processing of the social media ecosystem searching and contributing information comprising: cloud networking services, storage services, virtualization services, operating system services, run-time services, data services and application services executing on the plurality of pooled cloud hardware resources;

selecting on a first cloud application on a first cloud server network device with one or more processors stored in a first non-transitory computer readable medium, a cloud computing Infrastructure as a Service (IaaS), a cloud Platform as a Service (PaaS) and a Specific cloud software service as a Service (SaaS) including one or more specific cloud software services for social media ecosystem searching and contributing from the plurality of from the cloud software services executing on the plurality of pooled cloud hardware resources;

providing on the social media ecosystem for searching and contributing via the selected SaaS via the first cloud application via the cloud communications network a plurality of sets of personal electronic information to be completed on a plurality of target applications on a plurality of target network devices each with one or more processors operated by a plurality of users;

providing a selected set of personal electronic information from the plurality of sets of electronic information allowing an individual user operating an individual target network device to select via an individual target application on the individual target network device a plurality of individual set items for: (1) designating the individual user is in a time-of-need due to an unexpected life event, (2) designating a preferred support organization that will assist the individual user directly during the time-of-need due to the unexpected life event, (3) allowing a plurality other users operating other target network devices to make electronic charitable donations to the preferred support organization to assist the individual user during the time-of-need due to the unexpected life event, and (4) allowing the individual user to selectively enable and disable viewing of, by the plurality of other users, other sets of personal electronic information created by the individual user, thereby allowing the plurality other users to make electronic charitable donations only to the preferred support organization to assist the individual user during the time-of-need due to the unexpected life event;

receiving on the social media ecosystem for searching and contributing via the selected SaaS via the first cloud application on the first cloud server network device with the one or more processors via the cloud communications network, a plurality of sets of personal electronic information from the plurality of target applications on the plurality of target network devices each with one or more processors operated by the plurality of individual users;

extracting on the first cloud application via the selected SaaS the received plurality of sets of personal electronic information into a plurality of individual electronic lists of favorite items including a plurality of pre-determined categories;

storing from the first cloud application via the selected SaaS the extracted plurality of individual electronic lists of favorite items in a plurality of cloud storage objects on the cloud communications network;

linking from the first cloud application via the selected SaaS selected ones of list items from the stored plurality of individual electronic lists of favorite items to one or more social media sites in the social media ecosystem for searching and contributing via the cloud communications network;

linking from the first cloud application via the selected SaaS other selected ones of list items from the stored plurality of individual electronic lists of favorite items to one or more preferred electronic commerce vendor sites via the cloud communications network;

linking from the first cloud application via the selected SaaS other selected ones of the list items from the stored plurality of individual electronic lists of favorite items to one or more charitable organization sites via the cloud communications network;

linking from the first cloud application via the selected SaaS other selected ones of the list items from the stored plurality of individual electronic lists of favorite items to one or more preferred support organizations sites providing time-of-need financial assistance directly to any of the plurality of individual users due to unexpected life events via the cloud communications network;

providing the social media ecosystem for searching and contributing from the first cloud application via the selected SaaS with a combination public and private access to the plurality of individual electronic lists of favorite items for the plurality of individual users stored in the plurality of cloud storage objects on the cloud communications network linked to one or more social media sites, one or more preferred electronic commerce vendor sites, one or more charitable organization sites and one or more preferred support organizations sites, wherein the public access includes publically viewable search results from public search engines, social media sites and social media connections for the plurality of users and the private access including requiring a searcher to provide login information and permission access information to privately access a desired account for a desired user from the plurality of individual users;

providing controlled public access from the first cloud application via the selected SaaS to a plurality of general search engine sites and the plurality of social media sites via the cloud communications network to the plurality of individual users for the stored plurality of individual electronic lists of favorite items;

accepting on the first cloud application via the selected SaaS a plurality of public search requests for any of the plurality of individual users for which the stored plurality of individual electronic lists of favorite items are available via the cloud communications network;

providing from the first cloud application via the selected SaaS, secure private access with permission-based viewing of and private electronic purchase operations on the stored plurality of individual electronic lists of favorite items for the plurality of individual users;

accepting on the first cloud application via the selected SaaS, secure private electronic purchases of favorite items or electronic contributions to a charity or time-of-need financial assistance contributions from the stored plurality of individual electronic lists of favorite items for any of the plurality of individual users for which the stored plurality of individual electronic lists of favorite items are available via the cloud communications network;

ensuring via the selected SaaS, secure private access with login information and permission-based access control, private viewing and private electronic purchase operations on the plurality of individual electronic lists of favorite items so that social media connections are properly established, recorded and updated for the plurality of individual users in the social media ecosystem for controlled access public user searching and secure private contributing; and providing via the selected SaaS a layer of security and a layer of privacy for each of the plurality of individual users in the social media ecosystem for public user searching and secure private contributing.

2. The method of claim 1 wherein the social media ecosystem includes a community of participants and searchers in conjunction with a plurality of social media sites and technology components of a cloud communications environment comprising server network devices, gateways, routers, switches, web-sites, wired interfaces, wireless interfaces and target network devices interacting and cooperating as a social media ecosystem.

3. The method of claim 1 wherein the cloud storage objects include Representational state transfer (REST), Simple Object Access Protocol (SOAP), or Lightweight Directory Access Protocol (LDAP) cloud storage objects.

4. The method of claim 1 wherein the stored plurality of individual electronic lists includes: (1) basic personal information; (2) personal preference and favorites information; (3) charity contribution information; and (4) time-of-need information.

5. The method of claim 1 wherein the plurality of target network devices include multimedia capable desktop and laptop computers, tablet computers, facsimile machines, mobile phones, non-mobile phones, smart phones, Internet phones, Internet appliances, personal digital/data assistants (PDA), wearable network devices, digital cameras, portable game consoles, non-portable game consoles, cable television (CATV), satellite television (SATV) and Internet television set-top boxes, digital televisions including high definition television (HDTV), three-dimensional (3DTV) televisions.

6. The method of claim 5 wherein the plurality of target network devices include a smart cloud application for social media ecosystem gifting, charitable contributing and time-of-need donating.

7. The method of claim 1 the cloud server network device and the plurality of target network devices include a wireless networking interface comprising: a Wireless Personal Area Network (WPAN), Radio Frequency (RF), IEEE 802.11a, 802.11b, 802.11g, 802.11n, 802.15.4, 802.16a, 802.16g, Wireless Fidelity (WiFi), High Performance Radio Metropolitan Area Network (HIPERMAN) RF Home, Infrared (IrDA), Radio Frequency Identifier (RFID), Internet Protocol (IP), Voice over IP (VoIP), Short Message Service (SMS) or Instant Message (IM), Worldwide Interoperability for Microwave Access (WiMax), a Near Field Communications (NFC), or a Machine-to-Machine (M2M) wireless networking interface for communicating with the cloud communications network.

8. The method of claim 1 wherein the step of providing access from the first cloud application to the plurality of public search engines and to the plurality of social media sites via the cloud communications network, includes providing access to a plurality of public search engines including general search engines and vertical search engine services and the plurality of social media sites include a plurality of social networking sites, social couponing sites and social dating web-sites and the cloud communications network further includes cable television networks (CATV), satellite television networks (SATV), three-dimensional television (3DTV) networks, Internet television networks, Web-TV networks or Internet Protocol Television (IPtv) networks.

9. The method of claim 1 wherein the cloud communications network includes on-demand social media ecosystem search and contribution services, broadband network access, resource pooling, rapid elasticity and measured network services for social media ecosystem search services.

10. The method of claim 1 wherein the cloud communications network comprises one or more public communication networks, one or more private networks, one or more community networks and one or more hybrid networks.

11. The method of claim 1 wherein the step of allowing from the first cloud application secure private permission-based viewing of and electronic operations includes allowing secure private permission based viewing of and electronic operations with a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), Transport Layer Security (TLS) security or encryption method.

12. The method of claim 1 further comprising:
determining from the first cloud application via the selected SaaS whether a selected user of a selected target network device has included a time-of-need financial assistance request in a list item from the stored plurality of individual electronic lists of favorite items received from the selected target network device, and if so,
sending automatically from the first cloud application via the selected SaaS via the cloud communications network one or more first messages to the one or more support organization sites linked to the stored plurality of individual electronic lists of favorite items received from the selected target network device for the selected user indicating the selected user is in a time-of-need, and
sending automatically from the first cloud application via the selected SaaS via the cloud communications networks one or more second messages to the one or more social media sites linked to the stored plurality of individual electronic lists of favorite items received from the selected target network device for the selected user indicating the selected user is in a time-of-need.

13. The method of claim 1 further comprising:
determining from the first cloud application via the selected SaaS whether a selected user of a selected target network device has included a coupon request in a list item from the stored plurality of individual electronic lists of favorite items received from the selected target network device, and if so,
sending automatically from the first cloud application via the selected SaaS via the cloud communications network one or more first messages to the selected target network device including one or more electronic coupons from one or more electronic commerce vendors for one or more favorite items for the selected user.

14. The method of claim 12 further comprising wherein the one or more electronic coupons include one or more electronic coupons from one or more preferred electronic commerce vendors or one or move favorite electronic commerce vendors selected by the selected user.

15. The method of claim 12 further comprising:
providing from the first cloud application via the selected SaaS a plurality of electronic forms via the cloud communications network to the plurality of target applications on the plurality of target network devices to allow selection of individual electronic lists of favorite items, one or more social media sites, one or more electronic commerce vendor sites, one or more charitable organization sites and one or more support organizations sites providing time-of-need financial assistance; and
receiving on the first cloud application via the selected SaaS via the cloud communications network one or messages including the plurality of sets of personal electronic information from the plurality of target applications on the plurality of target network devices.

16. The method of claim 15 wherein the plurality of electronic forms include a plurality of drop down menus in a pre-determined hierarchy and an electronic gift box graphical icon.

17. The method of claim 15 wherein the plurality of electronic forms allow a selected user to input additional menus, menu items and custom categories from a selected target network device.

18. The method of claim 15 wherein the receiving step includes receiving the one or more messages on the first cloud application on the first cloud server network device from selected ones of the target application on the plurality of target network devices with a Near Field Communications (NFC), or a Machine-to-Machine (M2M) wireless networking interface.

19. The method of claim 1 further comprising:
receiving on the first cloud application via the selected SaaS one or more requests to electronically purchase one or more of the favorite items or make one or more electronic contributions to one or more charities or one or more time-of-need financial assistance contributions from one or more target applications on the one or more target network devices via the communications network; and
completing on the first cloud application via the selected SaaS the one or more requested electronic purchases of the one or more favorite items or the one or more electronic contributions to the one or more charities or the one or more time-of-need financial assistance contributions from the stored plurality of individual electronic lists of favorite items for any of the plurality of individual users for which the stored plurality of individual electronic lists of favorite items are available via the communications network.

20. A system for social media ecosystem searching and contributing, comprising in combination:

one or more server network devices with one or more processors;

one or more target network devices with one or more processors;

the one or more server network devices and the one or more network devices including one more or more non transitory computer readable mediums the one or more non transitory computer readable mediums including a plurality of instructions that when executed by a processor causes:

creating a social media ecosystem for searching and contributing on a plurality of cloud server network devices each with one or more processors on a cloud communications network, a plurality of pooled cloud hardware resources comprising: (1) automatic provisioning of the plurality of pooled cloud hardware resources as needed and available via the plurality of cloud broadband network access components on the plurality of cloud server network devices, (2) automatic scaling of the plurality of pooled cloud hardware resources to obtain and release one or more of the plurality of pooled cloud hardware resources as required, (3) automatic controlling and optimizing the pooled cloud hardware resources with a metering method, and (4) a plurality of cloud software services for automated processing of the social media ecosystem searching and contributing information comprising: cloud networking services, storage services, virtualization services, operating system services, run-time services, data services and application services executing on the plurality of pooled cloud hardware resources;

selecting on a first cloud application on a first cloud server network device with one or more processors stored in a first non-transitory computer readable medium, a cloud computing Infrastructure as a Service (IaaS), a cloud Platform as a Service (PaaS) and a Specific cloud software service as a Service (SaaS) including one or more specific cloud software services for social media ecosystem searching and contributing from the plurality of from the cloud software services executing on the plurality of pooled cloud hardware resources;

providing on the social media ecosystem for searching and contributing via the selected SaaS via the first cloud application via the cloud communications network a plurality of sets of personal electronic information to be completed on a plurality of target applications on the plurality of target network devices each with one or more processors operated by a plurality of users;

providing a selected set of personal electronic information from the plurality of sets of electronic information allowing an individual user operating an individual target network device to select via an individual target application on the individual target network device a plurality of individual set items for: (1) designating the individual user is in a time-of-need due to an unexpected life event, (2) designating a preferred support organization that will assist the individual user directly during the time-of-need due to the unexpected life event, (3) allowing a plurality other users operating other target network devices to make electronic charitable donations to the preferred support organization to assist the individual user during the time-of-need due to the unexpected life event, and (4) allowing the individual user to selectively enable and disable viewing of, by the plurality of other users, other sets of personal electronic information created by the individual user, thereby allowing the plurality other users to make electronic charitable donations only to the preferred support organization to assist the individual user during the time-of-need due to the unexpected life event;

receiving on the social media ecosystem for searching and contributing via the selected SaaS via the first cloud application on the first cloud server network device with the one or more processors via the cloud communications network, a plurality of sets of personal electronic information from the plurality of target applications on the plurality of target network devices each with one or m ore processors operated by the plurality of individual users;

extracting on the first cloud application via the selected SaaS the received plurality of sets of personal electronic information into a plurality of individual electronic lists of favorite items including a plurality of pre-determined categories;

storing from the first cloud application via the selected SaaS the extracted plurality of individual electronic lists of favorite items in a plurality of cloud storage objects on the cloud communications network;

linking from the first cloud application via the selected SaaS selected ones of list items from the stored plurality of individual electronic lists of favorite items to one or more social media sites in the social media ecosystem for searching and contributing via the cloud communications network;

linking from the first cloud application via the selected SaaS other selected ones of list items from the stored plurality of individual electronic lists of favorite items to one or more preferred electronic commerce vendor sites via the cloud communications network;

linking from the first cloud application via the selected SaaS other selected ones of the list items from the stored plurality of individual electronic lists of favorite items to one or more charitable organization sites via the cloud communications network;

linking from the first cloud application via the selected SaaS other selected ones of the list items from the stored plurality of individual electronic lists of favorite items to one or more preferred support organizations sites providing time-of-need financial assistance directly to any of the plurality of individual users due to unexpected life events via the cloud communications network;

providing the social media ecosystem for searching and contributing from the first cloud application via the selected SaaS with a combination public and private access to the plurality of individual electronic lists of favorite items for the plurality of individual users stored in the plurality of cloud storage objects on the cloud communications network linked to one or more social media sites, one or more preferred electronic commerce vendor sites, one or more charitable organization sites and one or more preferred support organizations sites, wherein the public access includes publically viewable search results from public search engines, social media sites and social media connections for the plurality of users and the private access including requiring a searcher to provide login information and permission access information to privately access a desired account for a desired user from the plurality of individual users;

providing controlled public access from the first cloud application via the selected SaaS to a plurality of general search engine sites and the plurality of social media sites via the cloud communications network to the plurality of individual users for the stored plurality of individual electronic lists of favorite items;

accepting on the first cloud application via the selected SaaS a plurality of public search requests for any of the plurality of individual users for which the stored plurality of individual electronic lists of favorite items are available via the cloud communications network;

providing from the first cloud application via the selected SaaS, secure private access with permission-based viewing of and private electronic purchase operations on the stored plurality of individual electronic lists of favorite items for the plurality of individual users;

accepting on the first cloud application via the selected SaaS, secure private electronic purchases of favorite items or electronic contributions to a charity or time-of-need financial assistance contributions from the stored plurality of individual electronic lists of favorite items for any of the plurality of individual users for which the stored plurality of individual electronic lists of favorite items are available via the cloud communications network;

ensuring via the selected SaaS, secure private access with login information and permission-based access control, private viewing and private electronic purchase operations on the plurality of individual electronic lists of favorite items so that social media connections are properly established, recorded and updated for the plurality of individual users in the social media ecosystem for controlled access public user searching and secure private contributing;

providing via the selected SaaS a layer of security and a layer of privacy for each of the plurality of individual users in the social media ecosystem for public user searching and secure private contributing;

determining from the first cloud application via the selected SaaS whether a selected user of a selected target network device has included a time-of-need financial assistance request in a list item from the stored plurality of individual electronic lists of favorite items received from the selected target network device, and if so, sending automatically from the first cloud application via the selected SaaS via the cloud communications network one or more first messages to the one or more support organization sites linked to the stored plurality of individual electronic lists of favorite items received from the selected target network device for the selected user indicating the selected user is in a time-of-need, and sending automatically from the first cloud application via the selected SaaS via the cloud communications networks one or more second messages to the one or more social media sites linked to the stored plurality of individual electronic lists of favorite items received from the selected target network device for the selected user indicating the selected user is in a time-of-need;

determining from the first cloud application via the selected SaaS whether a selected user of a selected target network device has included a coupon request in a list item from the stored plurality of individual electronic lists of favorite items received from the selected target network device, and if so, sending automatically from the first cloud application via the selected SaaS via the cloud communications network one or more first messages to the selected target network device including one or more electronic coupons from one or more electronic commerce vendors for one or more favorite items for the selected user;

providing from the first cloud application via the selected SaaS a plurality of electronic forms via the cloud communications network to the plurality of target applications on the plurality of target network devices to allow selection of individual electronic lists of favorite items, one or more social media sites, or more electronic commerce vendor sites, one or more charitable organization sites and one or more support organizations sites providing time-of-need financial assistance;

receiving on the first cloud application via the selected SaaS via the cloud communications network one or messages including the plurality of sets of personal electronic information from the plurality of target applications on the plurality of target network devices;

receiving on the first cloud application via the selected SaaS one or more requests to electronically purchase one or more of the favorite items or make one or more electronic contributions to one or more charities or one or more time-of-need financial assistance contributions from one or more target applications on the one or more target network devices via the communications network; and completing on the first cloud application via the selected SaaS the one or more requested electronic purchases of the one or more favorite items or the one or more electronic contributions to the charity or the one or more time-of-need financial assistance contributions from the stored plurality of individual electronic lists of favorite items for any of the plurality of individual users for which the stored plurality of individual electronic lists of favorite items are available via the communications network.

* * * * *